(12) United States Patent
Ishihara

(10) Patent No.: US 7,884,842 B2
(45) Date of Patent: Feb. 8, 2011

(54) MULTI-BEAM SCANNING APPARATUS

(75) Inventor: Keiichiro Ishihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1033 days.

(21) Appl. No.: 11/704,280

(22) Filed: Feb. 9, 2007

(65) Prior Publication Data
US 2007/0132829 A1 Jun. 14, 2007

Related U.S. Application Data

(62) Division of application No. 10/763,231, filed on Jan. 26, 2004, now Pat. No. 7,253,827.

(30) Foreign Application Priority Data

Jan. 31, 2003 (JP) .............................. 2003-024138

(51) Int. Cl.
*B41J 2/435* (2006.01)
*B41J 2/47* (2006.01)
(52) U.S. Cl. ...................................... 347/235; 347/250
(58) Field of Classification Search ................. 347/229, 347/233–237, 246–250, 243, 259–261
See application file for complete search history.

(56) References Cited

U.S. PATENT DOCUMENTS

| 6,185,029 | B1 | 2/2001 | Ishihara | 359/216 |
|---|---|---|---|---|
| 6,483,529 | B1 * | 11/2002 | Ito et al. | 347/235 |
| 6,535,317 | B2 * | 3/2003 | Ishibe | 359/205.1 |
| 6,665,103 | B2 | 12/2003 | Ishihara | 359/205 |
| 6,683,707 | B2 | 1/2004 | Ishihara et al. | 359/205 |
| 6,700,596 | B2 | 3/2004 | Ishihara | 347/134 |
| 7,034,859 | B2 | 4/2006 | Ishihara et al. | 347/244 |
| 7,053,922 | B2 | 5/2006 | Kato et al. | 347/244 |
| 7,253,827 | B2 * | 8/2007 | Ishihara | 347/235 |
| 2003/0001944 | A1 | 1/2003 | Yoshida et al. | 347/241 |
| 2003/0025784 | A1 | 2/2003 | Sato et al. | 347/244 |
| 2003/0048352 | A1 | 3/2003 | Kato et al. | 347/258 |
| 2003/0053185 | A1 | 3/2003 | Shimomura et al. | 359/197 |
| 2003/0063360 | A1 | 4/2003 | Ishihara | 359/212 |

* cited by examiner

*Primary Examiner*—Hai C Pham
(74) *Attorney, Agent, or Firm*—Fitzpatrick, Cella, Harper & Scinto

(57) ABSTRACT

A multi-beam optical scanning apparatus including a light source including a plurality of radiation points disposed spaced from each other in a main scanning direction and in a sub-scanning direction, a rotational polygon minor for deflecting a plurality of light beams radiated from the radiation points, and an imaging optical system for imaging the plurality of light beams deflected by a deflecting facet of the rotational polygon mirror. The deflecting facet has a width in which a light beam reaching a farthest location from a center of the deflecting facet is eclipsed by an edge of the deflecting facet if emitted prior to a light beam from a second radiation point when controlled by auto-power-control. Control is performed such that the light beam from the second radiation point is radiated prior to the light beam from the first radiation point when controlled by the auto-power-control.

6 Claims, 22 Drawing Sheets

US 7,884,842 B2

MULTI-BEAM SCANNING APPARATUS

This application is a division of application Ser. No. 10/763,231, filed Jan. 26, 2004, the contents of which are incorporated herein by reference.

BACKGROUND OF THE INVENTION

1. Field of the Invention

The present invention relates to a multi-beam scanning apparatus, and particularly to a scanning apparatus which is suitably applicable to image forming apparatuses, such as laser beam printers, digital copying machines, and multi-function printers that employ the electrophotographic process, and in which a light beam from a light source unit is reflectively deflected by a polygon mirror serving as a deflecting unit, transmitted through a scanning optical system, and scanned on a surface to be scanned (a scanned surface) to record image information. More particularly, the present invention relates to a multi-beam scanning apparatus in which plural light beams are simultaneously scanned to achieve operation with high speed and fine precision, and a deflecting unit, such as a polygon mirror, is effectively used to downsize the overall apparatus.

2. Related Background Art

FIG. 21 schematically illustrates a main portion of a conventional multi-beam scanning apparatus.

In FIG. 21, two beams emitted from a light source unit 91 and optically modulated according to image information are converted into approximately parallel light beams by a collimator lens 92, and are incident on a cylindrical lens 93. Each light beam incident on the cylindrical lens 93 emerges therefrom without any change in a main scanning section, and passes through an aperture stop 94. The light beam is partially intercepted by the aperture stop 94. With respect to a sub scanning section, each beam is converged by the cylindrical lens 93, passes through the aperture stop 94 with a portion of the light beam being intercepted, and is imaged on a deflecting facet 95a of a deflecting unit 95 as an approximately linear image (a linear image extending in a main scanning direction). Each light beam reflectively deflected by the deflecting facet 95a of the deflecting unit 95 is imaged on a photosensitive drum surface 97 in the form of a spot by a scanning optical system (a scanning lens) 96. The photosensitive drum surface 97 is scanned with the imaged spot moving at a uniform speed in a direction of an arrow B (the main scanning direction) when the deflecting unit 95 is rotated in a direction of an arrow A. Accordingly, two scanning lines are simultaneously formed on the photosensitive drum surface 97 serving as a recording material such that image recording can be executed.

At the time of the above-discussed operation, a portion (a BD light beam) of each light beam reflectively deflected by the deflecting unit 95 is guided to a light detecting device (a BD sensor) 99 of a synchronous detecting unit through a folding mirror (a BD mirror) 98 of the synchronous detecting unit by the scanning optical system 96, so that timing of a scanning start position on the photosensitive drum surface 97 can be adjusted prior to the scanning of the photosensitive drum surface 97 with the light spot. For each BD light beam, the timing of the scanning start position for image recording on the photosensitive drum surface 97 is adjusted, using a synchronous signal (a BD signal) obtained by detecting an output signal from the BD sensor 99. In FIG. 21, only a principal ray of each light beam is illustrated for the convenience of simplicity and easy understanding.

In such a multi-beam scanning apparatus, in order to obtain a high-quality image, the radiation amount of each light beam is adjusted (auto-power control (APC)) such that the amount of light projected on the photosensitive drum surface can be stably made constant, prior to the start of writing scanning lines.

Further, there has been proposed a multi-beam scanning apparatus which includes a light-amount monitor for performing synchronous detection (BD detection) and adjustment (APC) of the light amounts of plural light beams emitted from a light source unit, and in which the synchronous detection and the light-amount adjustment of the plural light beams are sequentially executed.

Those conventional multi-beam scanning apparatuses, however, do not mention the light radiation order of the light source unit by any means. Accordingly, the deflecting unit (the polygon mirror) therein cannot be effectively used, and hence there is a need to use a large deflecting unit.

Further, in a case where ends of the deflecting facet in the deflecting unit are chamfered, a light beam incident on the chamfered portion is likely to reach the photosensitive drum surface, leading to occurrence of the problem of ghost.

SUMMARY OF THE INVENTION

It is an object of the present invention to provide a multi-beam scanning apparatus which is capable of being downsized. Further, it is another object of the present invention to provide a multi-beam scanning apparatus which can eliminate the ghost light, and is capable of always achieving a preferable image.

According to one aspect of the present invention, there is provided a multi-beam optical scanning apparatus which includes a light source unit having a plurality of radiation points disposed with being spaced from each other in a main scanning direction, and a deflecting unit for deflecting a plurality of light beams radiated from the plurality of radiation points toward a surface to be scanned. In the multi-beam optical scanning apparatus, where a first radiation point is a radiation point for radiating the light beam, out of the plurality of light beams emitted from the plurality of radiation points, which reaches the farthest location from a center of a deflecting facet of the deflecting unit in the main scanning direction, a second radiation point is a radiation point for radiating another light beam, and an upstream-side external angular range is a range which lies in an angular range over which the light beam can be deflected by the deflecting unit, and which exists on an upstream side in a rotational direction of the deflecting unit relative to an effective scanning angular range at the time when the light beam is deflected toward an effective scanning range on the surface to be scanned, control is performed such that the light beam from the second radiation point can be radiated prior to the light beam from the first radiation point in the upstream-side external angular range.

In that multi-beam optical scanning apparatus, the light beam of the radiation point for radiating the light beam reaching a location nearest a center of the deflecting facet of the deflecting unit can be radiated in the first place, out of the plurality of light beams radiated by the light source unit. In this case, the light beam of the radiation point for radiating the light beam reaching a location nearer the center of the deflecting facet of the deflecting unit can be radiated in the order from the nearest location, out of the plurality of light beams radiated by the light source unit.

According to another aspect of the present invention, there is provided a multi-beam optical scanning apparatus which includes a light source unit having a plurality of radiation points disposed with being spaced from each other in a main scanning direction, and a deflecting unit for deflecting a plurality of light beams radiated from the plurality of radiation points toward a surface to be scanned, and in which the plurality of light beams radiated from the plurality of radiation points intersect each other M times (M=2n+1; n is an integer) between the light source unit and the deflecting unit. In the multi-beam optical scanning apparatus, where a first radiation point is a radiation point disposed on a most upstream side in a rotational direction of the deflecting unit, out of the plurality of radiation points, a second radiation point is a radiation point for radiating another light beam, and an upstream-side external angular range is a range which lies in an angular range over which the light beam can be deflected by the deflecting unit, and which exists on the upstream side in the rotational direction of the deflecting unit relative to an effective scanning angular range at the time when the light beam is deflected toward an effective scanning range on the surface to be scanned, control is performed such that the light beam from the second radiation point can be radiated prior to the light beam from the first radiation point in the upstream-side external angular range.

In that multi-beam optical scanning apparatus, the light beam of the radiation point disposed on a most downstream side in the rotational direction of the deflecting unit can be radiated in the first place. In this case, the light beam of the radiation point disposed on the more downstream side in the rotational direction of the deflecting unit can be radiated in the order from the most downstream side.

Further, in that multi-beam optical scanning apparatus, the radiation amount of the light beam can be adjusted by radiating the light beam from the radiation point of the light source unit in the upstream-side external angular range prior to the effective scanning range on the surface to be scanned. That multi-beam optical scanning apparatus can further include a scanning optical system for forming images of the plurality of light beams deflected by the deflecting unit on the surface to be scanned, and a synchronous detecting unit for detecting writing start timings on the surface to be scanned by receiving the plurality of light beams deflected by the deflecting unit, and in this apparatus, synchronous detection is performed by radiating the light beam directed to the synchronous detecting unit from the radiation point of the light source unit in the upstream-side external angular range prior to the effective scanning range on the surface to be scanned.

Further, in that multi-beam optical scanning apparatus, a chamfered portion can be formed at an edge of a deflecting facet of the deflecting unit.

Furthermore, in that multi-beam optical scanning apparatus, where a third radiation point is another radiation point other than the first radiation point disposed on the most upstream side in the rotational direction of the deflecting unit, the light beam of the third radiation point can be radiated in the first place in a downstream-side external angular range subsequent to the effective scanning range on the surface to be scanned.

According to still another aspect of the present invention, there is provided a multi-beam optical scanning apparatus which includes a light source unit having a plurality of radiation points disposed with being spaced from each other in a main scanning direction, and a deflecting unit for deflecting a plurality of light beams radiated from the plurality of radiation points toward a surface to be scanned, and in which the plurality of light beams radiated from the plurality of radiation points intersect each other N times (N=2n; n is an integer) between the light source unit and the deflecting unit. In the multi-beam optical scanning apparatus, where a first radiation point is a radiation point disposed on a most downstream side in a rotational direction of the deflecting unit, out of the plurality of radiation points, a second radiation point is a radiation point for radiating another light beam, and an upstream-side external angular range is a range which lies in an angular range over which the light beam can be deflected by the deflecting unit, and which exists on the upstream side in the rotational direction of the deflecting unit relative to an effective scanning angular range at the time when the light beam is deflected toward an effective scanning range on the surface to be scanned, control is performed such that the light beam from the second radiation point can be radiated prior to the light beam from the first radiation point in the upstream-side external angular range.

In that multi-beam optical scanning apparatus, the light beam of the radiation point disposed on the most upstream side in the rotational direction of the deflecting unit can be radiated in the first place. In this case, the light beam of the radiation point disposed on the more upstream side in the rotational direction of the deflecting unit can be radiated in the order from the most upstream side.

In that multi-beam optical scanning apparatus, the radiation amount of the light beam can be adjusted by radiating the light beam from the radiation point of the light source unit in the upstream-side external angular range prior to the effective scanning range on the surface to be scanned.

Further, that multi-beam optical scanning apparatus can further include a scanning optical system for forming images of the plurality of light beams deflected by the deflecting unit on the surface to be scanned, and a synchronous detecting unit for detecting writing start timings on the surface to be scanned by receiving the plurality of light beams deflected by the deflecting unit, and in this apparatus, synchronous detection is performed by radiating the light beam directed to the synchronous detecting unit from the radiation point of the light source unit in the upstream-side external angular range prior to the effective scanning range on the surface to be scanned.

Further, in that multi-beam optical scanning apparatus, a chamfered portion can be formed at an edge of a deflecting facet of the deflecting unit.

Furthermore, in that multi-beam optical scanning apparatus, where a third radiation point is another radiation point other than the first radiation point disposed on the most downstream side in the rotational direction of the deflecting unit, the light beam of the third radiation point can be radiated in the first place in a downstream-side external angular range subsequent to the effective scanning range on the surface to be scanned.

According to still another aspect of the present invention, there is provided a multi-beam optical scanning apparatus which includes a light source unit having a plurality of radiation points disposed with being spaced from each other in a main scanning direction, and a deflecting unit for deflecting a plurality of light beams radiated from the plurality of radiation points toward a surface to be scanned. In the multi-beam optical scanning apparatus, the light beam of the radiation point for radiating the light beam firstly incident on a deflecting facet of the deflecting unit in the main scanning direction is radiated prior to the light beam from the other radiation point.

That multi-beam optical scanning apparatus can further include a scanning optical system for forming images of the plurality of light beams deflected by the deflecting unit on the surface to be scanned, and a synchronous detecting unit for detecting writing start timings on the surface to be scanned by receiving the plurality of light beams deflected by the deflecting unit, and in this apparatus, synchronous detection is performed by radiating the light beam directed to the synchronous detecting unit from the radiation point of the light source unit in the upstream-side external angular range prior to the effective scanning range on the surface to be scanned.

According to still another aspect of the present invention, there is provided a multi-beam optical scanning apparatus which includes a light source unit having at least three radiation points disposed with being spaced from each other in a main scanning direction, and a deflecting unit for deflecting at least three light beams radiated from the at least three radiation points toward a surface to be scanned. In the multi-beam optical scanning apparatus, where a first radiation point is a radiation point for radiating the light beam, out of the at least three light beams emitted from the at least three radiation points, which reaches the farthest location from a center of a deflecting facet of the deflecting unit in the main scanning direction, a second radiation point is a radiation point for radiating another light beam, and an upstream-side external angular range is a range which lies in an angular range over which the light beam can be deflected by the deflecting unit, and which exists on an upstream side in a rotational direction of the deflecting unit relative to an effective scanning angular range at the time when the light beam is deflected toward an effective scanning range on the surface to be scanned, control is performed such that the light beam from the second radiation point can be radiated prior to the light beam from the first radiation point in the upstream-side external angular range.

In that multi-beam optical scanning apparatus, the light beam of the radiation point for radiating the light beam reaching a location nearest a center of the deflecting facet of the deflecting unit can be radiated in the first place, out of the at least three light beams radiated by the light source unit.

Further, in that multi-beam optical scanning apparatus, the light beam of the radiation point for radiating the light beam reaching a location nearer the center of the deflecting facet of the deflecting unit can be radiated in the order from the nearest location, out of the at least three light beams radiated by the light source unit.

According to still another aspect of the present invention, there is provided a multi-beam optical scanning apparatus which includes a light source unit having at least three radiation points disposed with being spaced from each other in a main scanning direction, and a deflecting unit for deflecting at least three light beams radiated from the at least three radiation points toward a surface to be scanned, and in which the at least three light beams radiated from the at least three radiation points intersect each other M times (M=2n+1; n is an integer) between the light source unit and the deflecting unit. In the multi-beam optical scanning apparatus, where a first radiation point is a radiation point disposed on a most upstream side in a rotational direction of the deflecting unit, out of the at least three radiation points, a second radiation point is a radiation point for radiating another light beam, and an upstream-side external angular range is a range which lies in an angular range over which the light beam can be deflected by the deflecting unit, and which exists on the upstream side in the rotational direction of the deflecting unit relative to an effective scanning angular range at the time when the light beam is deflected toward an effective scanning range on the surface to be scanned, control is performed such that the light beam from the second radiation point can be radiated prior to the light beam from the first radiation point in the upstream-side external angular range.

In that multi-beam optical scanning apparatus, the light beam of the radiation point disposed on a most downstream side in the rotational direction of the deflecting unit can be radiated in the first place.

Further, in that multi-beam optical scanning apparatus, the light beam of the radiation point disposed on the more downstream side in the rotational direction of the deflecting unit can be radiated in the order from the most downstream side.

Further, in that multi-beam optical scanning apparatus, the radiation amount of the light beam can be adjusted by radiating the light beam from the radiation point of the light source unit in the upstream-side external angular range prior to the effective scanning range on the surface to be scanned.

Further, that multi-beam optical scanning apparatus can further include a scanning optical system for forming images of the at least light beams deflected by the deflecting unit on the surface to be scanned; and synchronous detecting unit for detecting writing start timings on the surface to be scanned by receiving the at least three light beams deflected by the deflecting unit, and in this apparatus, synchronous detection is performed by radiating the light beam directed to the synchronous detecting unit from the radiation point of the light source unit in the upstream-side external angular range prior to the effective scanning range on the surface to be scanned.

Further, in that multi-beam optical scanning apparatus, a chamfered portion can be formed at an edge of a deflecting facet of the deflecting unit.

Further, in that multi-beam optical scanning apparatus, where a third radiation point is another radiation point other than the first radiation point disposed on the most upstream side in the rotational direction of the deflecting unit, the light beam of the third radiation point can be radiated in the first place in a downstream-side external angular range subsequent to the effective scanning range on the surface to be scanned.

According to still another aspect of the present invention, there is provided a multi-beam optical scanning apparatus which includes a light source unit having at least three radiation points disposed with being spaced from each other in a main scanning direction, and a deflecting unit for deflecting at least three light beams radiated from the at least three radiation points toward a surface to be scanned, and in which the at least three light beams radiated from the at least three radiation points intersecting each other N times (N=2n; n is an integer) between the light source unit and the deflecting unit. In the multi-beam optical scanning apparatus, where a first radiation point is a radiation point disposed on a most downstream side in a rotational direction of the deflecting unit, out of the at least three radiation points, a second radiation point is a radiation point for radiating another light beam, and an upstream-side external angular range is a range which lies in an angular range over which the light beam can be deflected by the deflecting unit, and which exists on the upstream side in the rotational direction of the deflecting unit relative to an effective scanning angular range at the time when the light beam is deflected toward an effective scanning range on the surface to be scanned, control is performed such that the light beam from the second radiation point can be radiated prior to the light beam from the first radiation point in the upstream-side external angular range.

In that multi-beam optical scanning apparatus, the light beam of the radiation point disposed on the most upstream side in the rotational direction of the deflecting unit can be radiated in the first place.

Further, in that multi-beam optical scanning apparatus, the light beam of the radiation point disposed on the more upstream side in the rotational direction of the deflecting unit can be radiated in the order from the most upstream side.

Further, in that multi-beam optical scanning apparatus, the radiation amount of the light beam can be adjusted by radiating the light beam from the radiation point of the light source unit in the upstream-side external angular range prior to the effective scanning range on the surface to be scanned.

Further, that multi-beam optical scanning apparatus can further include a scanning optical system for forming images of the at least three light beams deflected by the deflecting unit on the surface to be scanned, and synchronous detecting unit for detecting writing start timings on the surface to be scanned by receiving the at least three light beams deflected by the deflecting unit, and in this apparatus, synchronous detection is performed by radiating the light beam directed to the synchronous detecting unit from the radiation point of the light source unit in the upstream-side external angular range prior to the effective scanning range on the surface to be scanned.

Further, in that multi-beam optical scanning apparatus, a chamfered portion can be formed at an edge of a deflecting facet of the deflecting unit.

Further, in that multi-beam optical scanning apparatus, where a third radiation point is another radiation point other than the first radiation point disposed on the most downstream side in the rotational direction of the deflecting unit, the light beam of the third radiation point can be radiated in the first place in a downstream-side external angular range subsequent to the effective scanning range on the surface to be scanned.

According to still another aspect of the present invention, there is provided a multi-beam optical scanning apparatus which includes a light source unit having at least three radiation points disposed with being spaced from each other in a main scanning direction, and a deflecting unit for deflecting at least three light beams radiated from the at least three radiation points toward a surface to be scanned. In the apparatus, the light beam of the radiation point for radiating the light beam firstly incident on a deflecting facet of the deflecting unit in the main scanning direction is radiated prior to the light beam from the other radiation point.

Further, that multi-beam optical scanning apparatus can further include a scanning optical system for forming images of the at least three light beams deflected by the deflecting unit on the surface to be scanned, and synchronous detecting unit for detecting writing start timings on the surface to be scanned by receiving the at least three light beams deflected by the deflecting unit, and in this apparatus, synchronous detection is performed by radiating the light beam directed to the synchronous detecting unit from the radiation point of the light source unit in the upstream-side external angular range prior to the effective scanning range on the surface to be scanned.

According to still another aspect of the present invention, there is provided a multi-beam optical scanning apparatus which includes a light source unit having a plurality of radiation points disposed with being spaced from each other in a main scanning direction, and a deflecting unit for deflecting a plurality of light beams radiated from the plurality of radiation points toward a surface to be scanned. In the multi-beam optical scanning apparatus, where a first radiation point is a radiation point for radiating the light beam, out of the plurality of light beams emitted from the plurality of radiation points, which reaches the farthest location from a center of a deflecting facet of the deflecting unit in the main scanning direction, a second radiation point is a radiation point for radiating another light beam, and an upstream-side external angular range is a range which lies in an angular range over which the light beam can be deflected by the deflecting unit, and which exists on an upstream side in a rotational direction of the deflecting unit relative to an effective scanning angular range at the time when the light beam is deflected toward an effective scanning range on the surface to be scanned, a width of the deflecting facet in a main scanning section is set to such a magnitude that the light beam reaching the location most spaced from the center of the deflecting facet at an end portion of the deflecting facet is eclipsed in the event that the light beam from the first radiation point for radiating the light beam reaching the location most spaced from the center of the deflecting facet is radiated prior to the light beam from the second radiation point in the upstream-side external angular range, and control is performed such that the light beam from the second radiation point can be radiated prior to the light beam from the first radiation point in the upstream-side external angular range.

According to still another aspect of the present invention, there is provided a multi-beam optical scanning apparatus which includes a light source unit having a plurality of radiation points disposed with being spaced from each other in a main scanning direction, and a deflecting unit for deflecting a plurality of light beams radiated from the plurality of radiation points toward a surface to be scanned. In the multi-beam optical scanning apparatus, a width of the deflecting facet in a main scanning section is set to such a magnitude that the light beam last incident on an end portion of the deflecting facet is eclipsed in the event that the light beam from the radiation point for radiating the light beam last incident on the deflecting facet of the deflecting unit is radiated prior to the light beam from the other radiation point, and the light beam of the radiation point for radiating the light beam firstly incident on the deflecting facet of the deflecting unit in the main scanning direction is radiated prior to the light beam from the other radiation point.

According to still another aspect of the present invention, there is provided a multi-beam optical scanning apparatus which includes a light source unit including at least three radiation points disposed with being spaced from each other in a main scanning direction, and a deflecting unit for deflecting at least three light beams radiated from the at least three radiation points toward a surface to be scanned. In the multi-beam optical scanning apparatus, where a first radiation point is a radiation point for radiating the light beam, out of the at least three light beams emitted from the at least three radiation points, which reaches the farthest location from a center of a deflecting facet of the deflecting unit in the main scanning direction, a second radiation point is a radiation point for radiating another light beam, and an upstream-side external angular range is a range which lies in an angular range over which the light beam can be deflected by the deflecting unit, and which exists on an upstream side in a rotational direction of the deflecting unit relative to an effective scanning angular range at the time when the light beam is deflected toward an effective scanning range on the surface to be scanned, a width of the deflecting facet in a main scanning section is set to such a magnitude that the light beam reaching the farthest location from a center of the deflecting facet at an end portion of the deflecting facet is eclipsed in the event that the light beam from the first radiation point for radiating the light beam reaching the location most spaced from the center of the deflecting facet is radiated prior to the light beam from the second radiation point in the upstream-side external angular range, and control is performed such that the light beam from the second radiation point can be radiated prior to the light beam from the first radiation point in the upstream-side external angular range.

According to still another aspect of the present invention, there is provided a multi-beam optical scanning apparatus which includes a light source unit including at least three radiation points disposed with being spaced from each other in a main scanning direction, and a deflecting unit for deflecting at least three light beams radiated from the at least three radiation points toward a surface to be scanned. In the multi-beam optical scanning apparatus, a width of a deflecting facet of the deflecting unit in a main scanning section is set to such a magnitude that the light beam last reaching an end portion of the deflecting facet is eclipsed in the event that the light beam from the radiation point for radiating the light beam last incident on the deflecting facet of the deflecting unit is radiated prior to the light beam from the other radiation point, and the light beam from the radiation point for radiating the light beam firstly incident on the deflecting facet of the deflecting unit in the main scanning direction is radiated prior to the light beam from the other radiation point.

In those multi-beam optical scanning apparatuses, the light source unit can be comprised of a monolithic semiconductor laser.

According to still another aspect of the present invention, there is provided an image forming apparatus which includes the multi-beam optical scanning apparatus described above, an image bearing member placed at the surface to be scanned, a developing unit for developing an electrostatic latent image, which is formed on the image bearing member by the light beam scanned by the multi-beam optical scanning apparatus, as a toner image, a transferring unit for transferring the developed toner image onto a transferring material, and a fixing unit for fixing the transferred toner image on the transferring material.

According to still another aspect of the present invention, there is provided an image forming apparatus which includes the multi-beam optical scanning apparatus described above, and a printer controller for converting code data input from an external apparatus into an image signal to supply the image signal to the multi-beam optical scanning apparatus.

According to still another aspect of the present invention, there is provided a color image forming apparatus which includes a plurality of multi-beam optical scanning apparatuses each of which includes a multi-beam optical scanning apparatus described above, and a plurality of image bearing members each of which is placed at the surface to be scanned of the each multi-beam optical scanning apparatus, and which form images of different colors, respectively.

According to still another aspect of the present invention, there is provided a color image forming apparatus which includes a multi-beam optical scanning apparatus described above, and a printer controller for converting code data input from an external apparatus into an image signal to supply the image signal to the multi-beam optical scanning apparatus.

These and further aspects and features of the invention will become apparent from the following detailed description of preferred embodiments thereof in conjunction with the accompanying drawings.

DESCRIPTION OF THE PREFERRED EMBODIMENTS

First Embodiment

Figure 1:
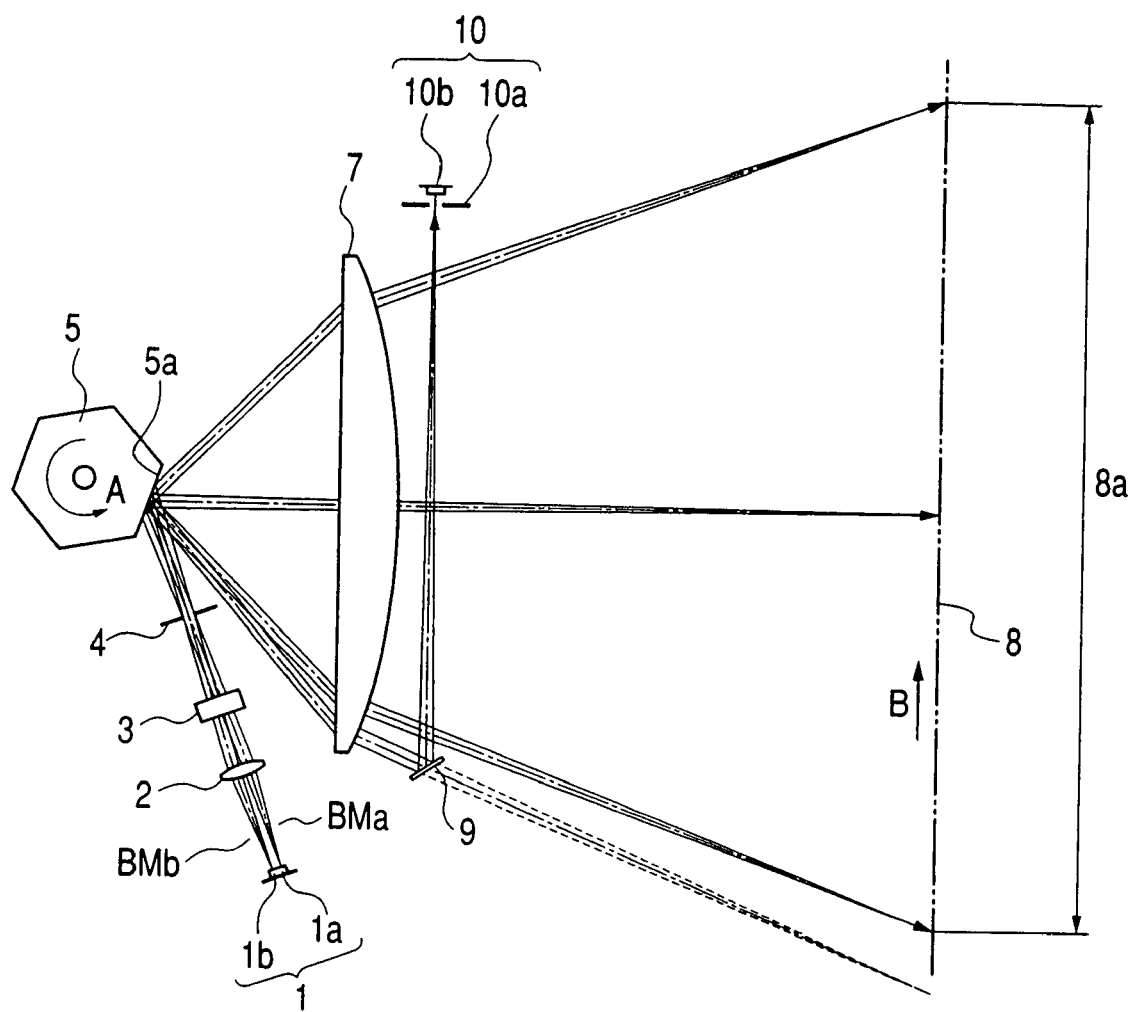
FIG. 1 is a cross-sectional view in a main scanning section illustrating a multi-beam optical scanning apparatus of a first embodiment according to the present invention.

FIG. 1 is a cross-sectional view in a main scanning direction illustrating a main portion of a multi-beam scanning apparatus of a first embodiment according to the present invention.

Here, the main scanning direction means a direction perpendicular to a rotational axis of a deflecting unit and an optical axis of a scanning optical system (i.e., a direction along which a light beam is reflectively deflected (deflection-scanned) by the deflecting unit), and the sub scanning direction-means a direction parallel to the rotational axis of the deflecting unit. Further, the main scanning section means a plane parallel to the main scanning direction and including the optical axis of the scanning optical system. The sub scanning section means a plane perpendicular to the main scanning section.

In FIG. 1, reference numeral 1 represents a light source unit comprised of a monolithic semiconductor laser array including two radiation points 1a and 1b. The two radiation points 1a and 1b are spaced from each other in both the main scanning direction and the sub scanning direction. In a scanning apparatus of the present invention, the above light source unit can be replaced by a light source unit including three or more radiation points spaced from each other in both the main scanning direction and the sub scanning direction.

Reference numeral 2 represents a condensing lens system (a collimator lens) comprised of a single lens. The condensing lens system 2 converts two light beams BMa and BMb emitted from the light source unit 1 into nearly parallel light beams (or nearly diverging light beams, or nearly converging light beams).

Reference numeral 3 represents a lens system (a cylindrical lens) having a predetermined refractive power only in the sub scanning direction. Reference numeral 4 represents an aperture stop for restricting a light beam (the amount of light). The aperture stop 4 shapes two light beams BMa and BMb emerging from the cylindrical lens 3 into desired optimum beam forms.

Elements of the collimator lens 2, the cylindrical lens 3, the aperture stop 4 and the like constitute a portion of an incidence optical unit.

Reference numeral 5 represents an optical deflector (serving as a deflecting unit) comprised of a polygon mirror with six facets, for example, which is rotated at a uniform speed in a direction of an arrow A by a driving unit (not shown) such as a motor.

Reference numeral 7 represents a scanning optical system which has imaging performance and f-φ θ characteristic, and consists of a single scanning lens. The scanning optical system 7 forms spot-shaped images of the two light beams BMa and BMb deflected by the optical deflector 5 on a photosensitive drum surface 8, and two scanning lines are thus formed on the photosensitive drum surface 8. The scanning optical system 7 establishes a conjugate relationship between a place close to a deflecting facet 5a of the optical deflector 5 and a place close to the photosensitive drum surface 8 in the sub scanning section such that fall or inclination of the reflective deflection facet 5a can be compensated for.

Reference numeral 8 represents the surface of the photosensitive drum, which is a surface to be scanned. Reference numeral 8a represents an effective scanning range.

Reference numeral 9 represents a folding mirror (a BD mirror) for synchronous detection, which reflects toward a side of a synchronous detecting unit 10 two light beams (BD beams) for synchronous detection and for adjustment of timing of a scanning start position on the photosensitive drum surface 8.

Reference numeral 10 represents the synchronous detecting unit which includes a slit (a BD slit) 10a for synchronous detection, and an optical sensor (a BD sensor) 10b serving as a synchronous detecting device. In the synchronous detecting unit 10, a synchronous signal (a BD signal) obtained by detection of an output signal from the BD sensor 10b is used to adjust the timing of the scanning start position of image recording on the photosensitive drum surface 8. The BD slit 10a is disposed at a location which is optically equivalent to the photosensitive drum surface 8 to determine a writing start position of an image.

Elements of the BD mirror 9, the BD slit 10a, the BD sensor 10 and the like constitute a portion of a synchronous detecting optical system (a BD optical system).

In the first embodiment, two light beams BMa and BMb emitted from the light source unit 1 and optically modulated according to image information are converted into nearly parallel light beams by the collimator lens 2, and are incident on the cylindrical lens 3. Each light beam incident on the cylindrical lens 3 emerges therefrom without any change in the main scanning section, and passes through the aperture stop 4. The light beam is partially intercepted by the aperture stop 4. With respect to the sub scanning section, each light beam is converged by the cylindrical lens 3, passes through the aperture stop 4 with a portion of the light beam being intercepted, and is imaged on the deflecting facet 5a of the optical deflector 5 as an approximately linear image (a linear image extending in the main scanning direction). Each of the light beams BMa and BMb reflectively deflected by the deflecting facet 5a of the optical deflector 5 is imaged on the photosensitive drum surface 8 in the form of a spot by the scanning lens 7. The photosensitive drum surface 8 is scanned with the imaged spot moving at a uniform speed in a direction of an arrow B (the main scanning direction) when the optical deflector 5 is rotated in a direction of an arrow A. Accordingly, two scanning lines are simultaneously formed on the photosensitive drum surface 8 serving as a recording material such that image recording can be executed thereon.

Here, in the main scanning section, widths of the two light beams BMa and BMb incident on the deflecting facet 5a are smaller than a facet width of the deflecting facet 5a (an under-field optical system).

At the time of the above-discussed operation, a portion (a BD light beam) of each of the two light beams BMa and BMb reflectively deflected by the optical deflector 5 is condensed on the BD slit 10a through the BD mirror 9, and then guided to the BD sensor 10b, so that the timing of the scanning start position on the photosensitive drum surface 8 can be adjusted prior to the optical scanning of the photosensitive drum surface 8. For each BD light beam, the timing of the scanning start position in the main scanning direction for image recording on the photosensitive drum surface 8 is adjusted, using the synchronous signal (a BD signal) obtained by detecting the output signal from the BD sensor 10b.

Figure 2:
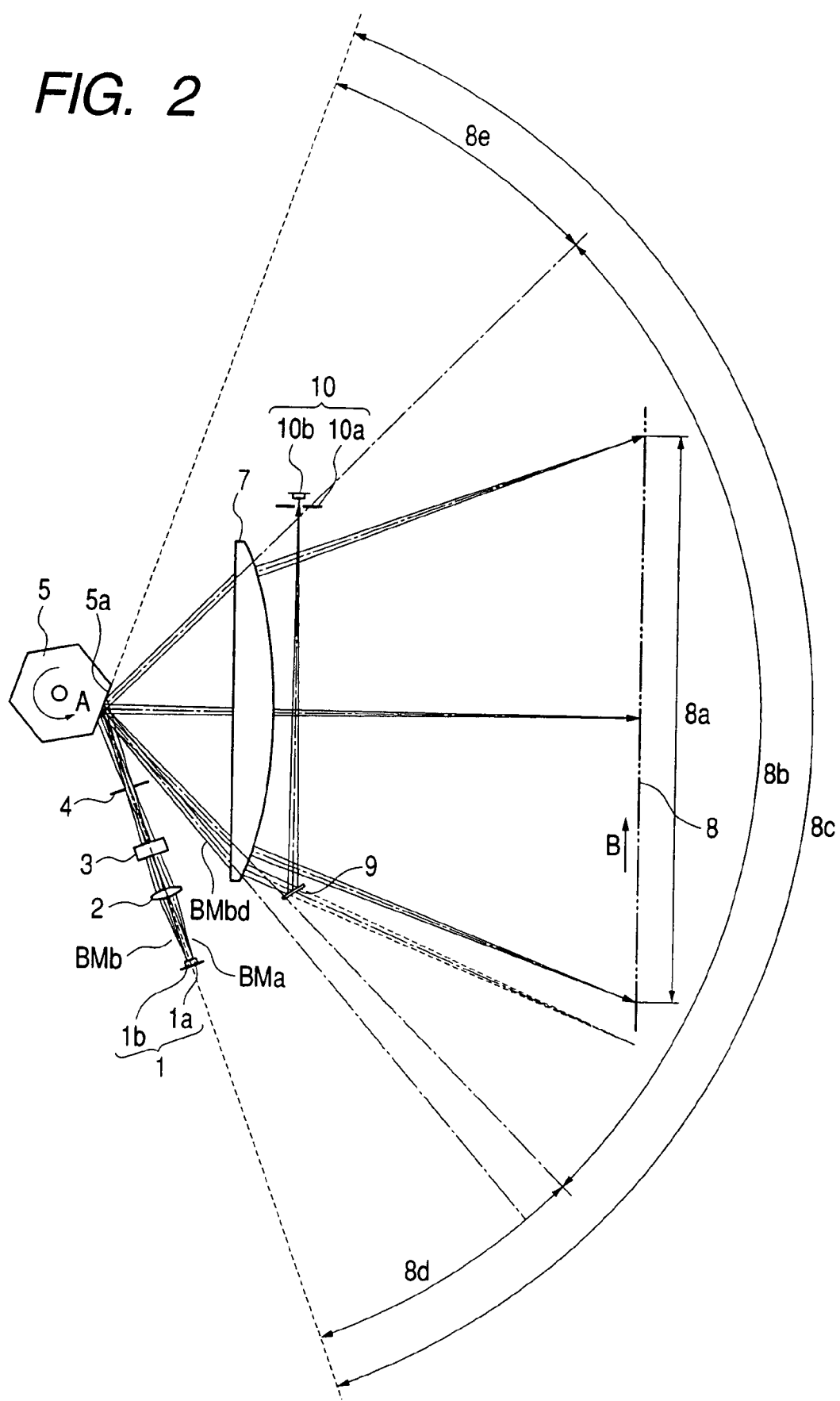
FIG. 2 is a view schematically illustrating a main portion of the multi-beam optical scanning apparatus of the first embodiment.

FIG. 2 schematically illustrates a main portion of the multi-beam scanning apparatus of the first embodiment. In FIG. 2, like reference numerals designate the same elements as those illustrated n FIG. 1.

In FIG. 2, there is an angular limitation to a range over which the deflecting facet 5a of the optical deflector 5 can deflect the light beam emitted from the light source unit 1. In FIG. 2, "a deflectable angular range" 8c represents that limited angular range, and this range is an angular range of 100-% scanning efficiency. A range of a deflectable angle θc (rad) is given by $$-4/\pi C \leq \theta c \leq 4\pi/C \qquad \text{relation 1}$$

where C is the number of facets of the optical deflector.

In the first embodiment, the number C of the facets of the optical deflector 5 is six (6), and the range of the deflectable angle θc (rad) can be written, from relation 1, as follows $$-2\pi/3 \leq \theta c \leq 2\pi/3 \qquad \text{relation 2}$$

In the case of the scanning optical system, the deflection angle (an angle of view) on-to-one corresponds to the scan position, and accordingly when the range is designated, it is possible to use not only the deflection angle but also the scan position.

Normally, "an effective scanning angular range" 8b is present in a central portion of the above-discussed "deflectable angular range" 8c, and its scanning positional counterpart is "an effective scanning range" 8a wherein a latent image is formed on the photosensitive drum surface 8. Further, on an upstream side in the rotational direction of the optical deflector 5 relative to the "effective scanning angular range" 8b, there exists "an upstream-side external angular range" 8d which is a portion of the "deflectable angular range" 8c. A light beam (a BD light beam) BMbd guided toward the synchronous detecting unit 10 is present in that external angular range. "A downstream-side external angular range" 8e exists on a downstream side, and there can be a case where a light beam (a BD light beam) guided toward the synchronous detecting unit 10 is also present in this downstream-side external angular range.

Also in conventional single-beam scanning apparatuses, in the event that an angular range of a light beam deflected by the optical deflector 5 extends to the "upstream-side external angular range" or "downstream-side external angular range" outside the "effective scanning angular range", such as a case where the light beam is deflected and guided toward the synchronous detecting unit 10, a light beam emitted from the light source unit 1 is reflectively deflected using a place in the vicinity of the end of the deflecting facet 5a. Therefore, there is not so much room between the edge of the light beam and the end of the deflecting facet 5a.

The relationship between the width of an incident light beam used in this embodiment and the optical deflector 5 in the event that the incident light beam is eclipsed by the optical deflector 5 is given by $$Wm > Wnir + Wfar - W\max - (n-1) \times \Delta Tm - 2 \times Pc \qquad (1)$$

where $$W\max = 2 \times Rp \times \sin\left(\frac{\pi}{Mp} - \theta y\max\right) \times \cos\left(\frac{Ai}{2}\right)$$

$$Wnir = 2 \times Rp \times \sin\left(\frac{\pi}{Mp} - \theta y\max - \frac{\phi}{2}\right) \times \cos\left(\frac{Ai - \phi}{2}\right)$$

-continued $$Wfar = 2 \times Rp \times \sin\left(\frac{\pi}{Mp} - \theta y\max - \frac{\xi}{2}\right) \times \cos\left(\frac{Ai + \xi}{2}\right)$$

and Wm is the width (mm) of the incident light beam in the main scanning direction, n is the number of beams, ΔTm is the deviation (mm) between adjacent light beams (see relation 5 discussed below), Pc is the chamfer amount (mm) on one side, Rp is the radius (mm) of a circumscribed circle of the optical deflector 5 (the polygon mirror), Mp is the number of facets of the optical deflector 5 (the polygon mirror), θymax is the absolute value (rad) of a rotational angle of the optical deflector 5 (the polygon mirror) at the maximum image height, Ai is the incident angle (rad) of the incident light beam (the angle between the optical axis of the incident light beam and the optical axis of the scanning optical system), φ is the angular difference (rad) between the absolute value of the rotational angle of the optical deflector 5 at the time when the light beam is deflected to the external angular range on the side of presence of the incident light beam, and the rotational angle θymax of the optical deflector 5 at the maximum image height, and ξ is the angular difference (rad) between the absolute value of the rotational angle of the optical deflector 5 at the time when the light beam is deflected to the external angular range on the side of absence of the incident light beam, and the rotational angle θymax of the optical deflector 5 at the maximum image height.

In the first embodiment, n=4, α=0.0038 (rad), Lap=33.00 (mm), ΔTm=0.1238 (mm), Pc=0.21 (mm), Ra=20 (mm), Mp=6, θymax=0.3927 (rad), Ai=1.0472 (rad), φ=0.0349 (rad), and ξ=0.0349 (rad). This will be referred to as condition A. Ray eclipse of the incident light beam occurs from relation (1) when the width Wm of the incident light beam in the main scanning direction is Wm>2.78 (mm).

The ray eclipse can occur even if the above condition is not satisfied. The reason therefor is that there is a need to preferably correct aberration at a position of a high image height by disposing the optical deflector 5 in a position close to a 100-% crossing position, rather than by disposing the optical deflector 5 in such a manner that the light beam can be most widely reflectively deflected.

Further, in the event that the optical deflector 5 is disposed in the 100-% crossing position, it is likely to cause the problem that the width of the light beam capable of being reflectively deflected is narrow. Therefore, the optical deflector 5 is often disposed being shifted from the 100-% crossing position.

In the following, there is shown the relationship between the arrangement of the deflector (the polygon mirror) and the width Wm of the incident light beam in the main scanning direction at the time when the ray eclipse occurs, in the event that the optical deflector 5 is disposed being shifted from the 100-% crossing position.

$$Wm > (Dcloss + Wnir - W\max - Pc + \Delta Ybm) \times 2 - (n-1) \times \Delta Tm \qquad (2)$$

or $$Wm > (Wfar - Dcloss - Pc - \Delta Ybm) \times 2 - (n-1) \times \Delta Tm \qquad (3)$$

where $$Dcloss = Rp \times \sin\left(\frac{\pi}{Mp} - \theta y\max\right) \times \frac{\cos\left(\theta y\max + \frac{Ai}{2}\right)}{\cos(\theta y\max)}$$

and ΔYbm is the amount of shift of the principal ray of the incident light beam from a 100-% crossing point in a direction perpendicular to the incident light beam (a direction in which the principal ray of the incident light beam approaches the optical axis of the scanning optical system is a plus direction). The 100-% crossing point is defined by a crossing point between deflecting facets under conditions under each of which the incident light beam is deflected to the maximum image height on each of opposite sides.

In the event that the amount ΔYbm of shift of the incident light beam is ΔYbm=0.50 (mm) in addition to the above-discussed condition A, the incident light beam is eclipsed by the optical deflector 5 when Wm>2.77 (mm), as can be understood from relation (2). The incident light beam is eclipsed by the optical deflector 5 when Wm>2.78 (mm), as can be understood from relation (3).

In the first embodiment, as described later, where a first radiation point is defined by a radiation point for radiating a light beam, out of two light beams BMa and BMb emitted from the light source unit 1, that reaches the farthest location from a center of the deflecting facet of the optical deflector 5 in the main scanning direction, and a second radiation point is defined by a radiation point for radiating another light beam, the second radiation point is excited in the first place such that a light beam therefrom can be in the upstream-side external angular range 8d in the deflectable angular range 8c of the optical deflector 5, which lies on the upstream side in the rotational direction of the optical deflector 5 relative to the effective scanning angular range 8b at the time when the light beam is deflected and guided toward the effective scanning range 8a on the photosensitive drum surface 8.

Figure 3:
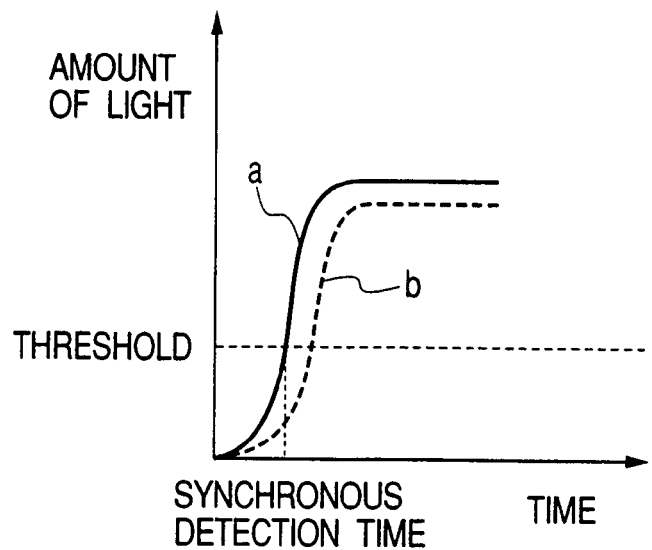
FIG. 3 is a view showing operation of a synchronous detecting unit in the first embodiment according to the present invention.

FIG. 3 shows a manner of optical detection in the synchronous detecting unit 10. In the synchronous detecting unit 10, the amount of light passing through the BD slit 10a and detected by the BD sensor 10b increases with time, as indicated by a solid line a in FIG. 3, and a moment (time) at which the light amount reaches a threshold is detected. Radiation is started at a time after a predetermined time of period from the detection moment such that the scanning start positions in the main scanning direction on the scanned surface 8 for the two light beams can be aligned with each other.

Figure 4:
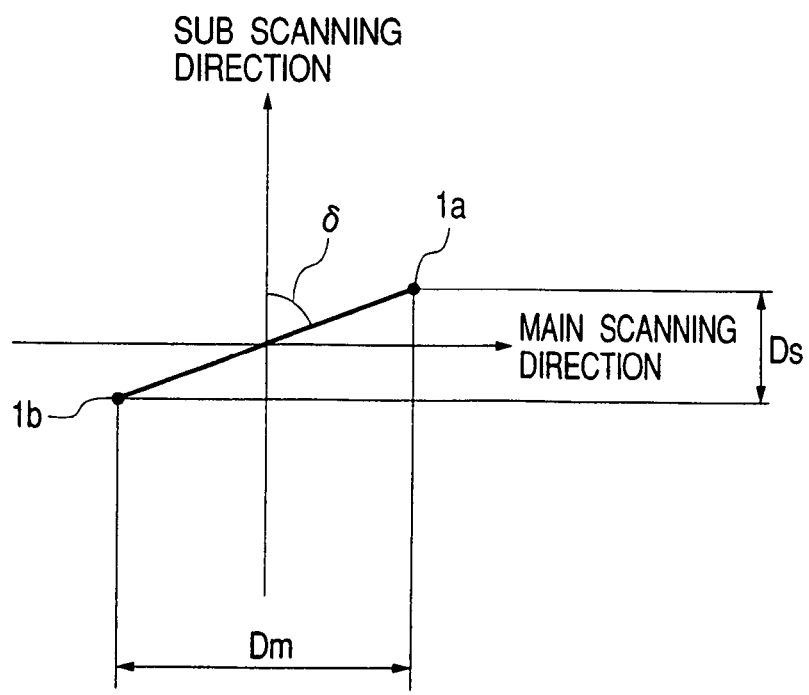
FIG. 4 is a view schematically showing a main portion of a light source unit in the first embodiment according to the present invention.

FIG. 4 illustrates the arrangement of the two radiation points 1a and 1b in the light source unit 1. In the multi-beam scanning apparatus of the first embodiment, the light source unit 1 is rotated by an angle δ about the optical axis and adjusted such that the distance between scanning lines on the scanned surface 8 can be a predetermined distance corresponding to the density of pixels. The two radiation points 1a and 1b are thus spaced from each other by a distance Ds in the main scanning direction, and also spaced by a distance Dm in the sub scanning direction.

Figure 5:
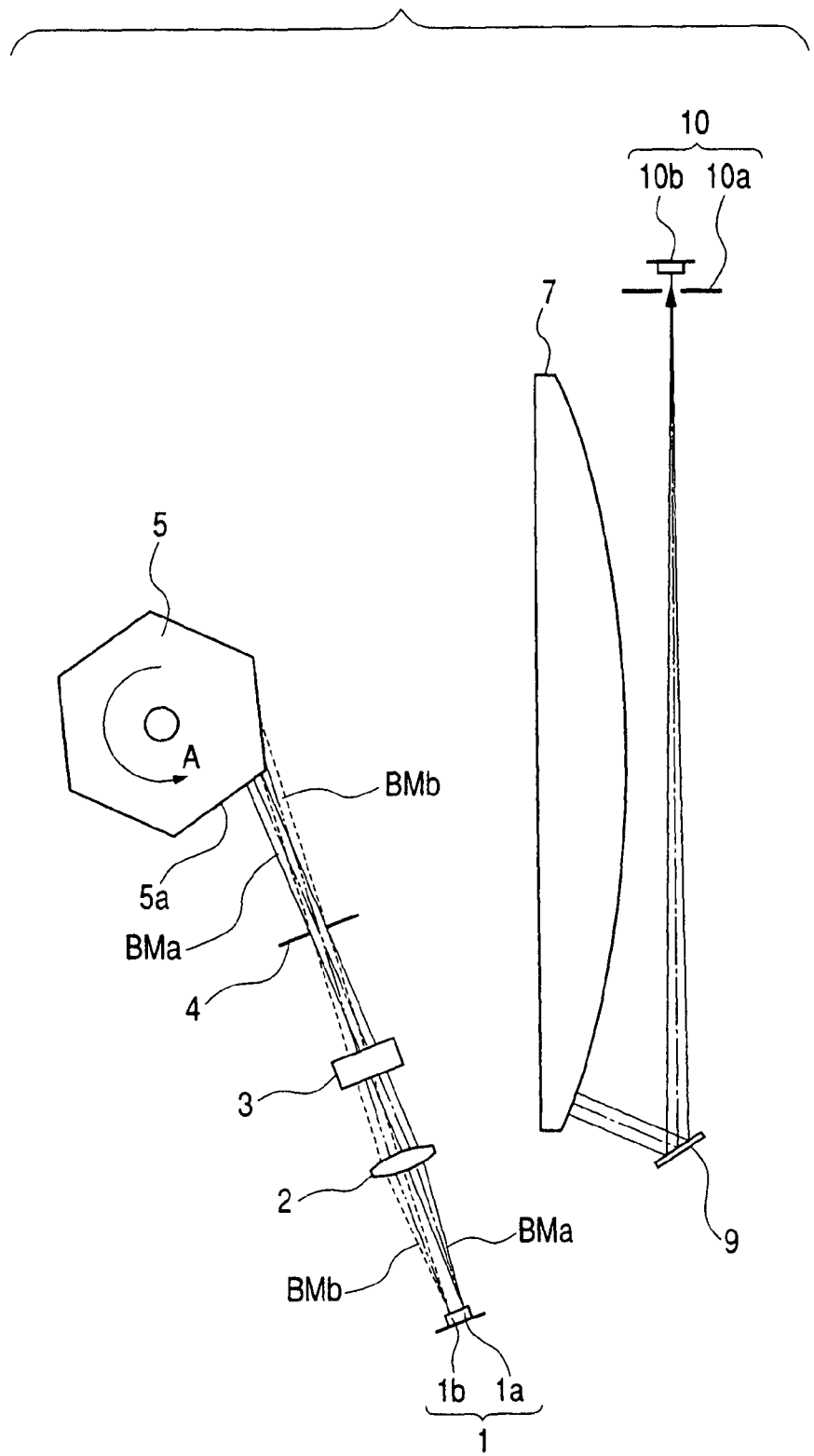
FIG. 5 is a view schematically illustrating the main portion of the multi-beam optical scanning apparatus of the first embodiment.

FIG. 5 schematically illustrates a main portion in the main scanning direction of the multi-beam scanning apparatus of the first embodiment. In FIG. 5, like reference numerals designate the same elements as those illustrated in FIG. 1. FIG. 5 schematically illustrates a manner in which light beams emitted from the light source unit 1 are reflectively deflected toward the synchronous detecting unit 10 by the optical deflector 5.

In the main scanning direction of the multi-beam scanning apparatus of the first embodiment, the two radiation points 1a and 1b are spaced from each other in the main scanning direction, and the two light beams BMa and BMb are incident on the deflecting facet 5a at different incident angles, so that principal rays of the two light beams BMa and BMb radiated from the respective radiation points 1a and 1b reach positions on the deflecting facet 5a spaced from each other in the main scanning direction. Accordingly, when the two light beams BMa and BMb radiated from the light source unit 1 are deflected by the deflecting facet 5a of the optical deflector 5 toward the synchronous detecting unit 10, for example, there exist the light beam BMa (indicated by a solid line), out of the two light beams, that reaches the location near the center of the deflecting facet 5a, and the light beam BMb (indicated by a dashed line) that reaches the location far from the center of the deflecting facet 5a. With the light beam BMb reaching the location far from the center of the deflecting facet 5a, there is a fear that its light cannot be entirely placed on the deflecting facet 5a and eclipsed by the deflecting facet 5a.

In the event that the light beam BMb eclipsed by the deflecting facet 5a is incident on the synchronous detecting unit 10, the amount of light detected by the BD sensor 10b decreases. Then, it takes longer time the light amount to reach the threshold as illustrated by a dashed line b in FIG. 3. Accordingly, the problem occurs that timing is delayed and the scanning start position deviates. Particularly, in the case of the multi-beam scanning apparatus, the amount of light eclipsed by the deflecting facet 5a is likely to vary between individual light beams, and the scanning start position of the scanning line for each light beam fluctuates, leading to degradation of the image quality. Therefore, the eclipse of the light beam from the light source unit 1 by the deflecting facet 5a is a critical problem.

Such a problem is serious in the multi-beam scanning apparatus with high resolution. For example, the problem is very serious in a scanning apparatus with over 600 dpi. Especially, the problem is more serious in a multi-beam scanning apparatus usable in a color image forming apparatus with over 1200 dpi.

Further, the present invention exhibits preeminent advantages when applied to a tandem-type color image forming apparatus (described later with reference to FIG. 20) provided with a plurality of surfaces to be scanned. The reason therefor is that color shift (registration shift) due to the shift in scanning start positions of plural light beams incident on the same scanned surface is a serious problem in the tandem-type color image forming apparatus in which plural light beams are incident on different scanned surfaces (for example, photosensitive drums) to form images of different colors on the different scanned surfaces, respectively, and superimposition of the images of different colors are then performed on a sheet of paper.

However, if the size of the deflecting facet 5a is increased, not only the size of the optical deflector 5 but also torque of a driving unit for rotating the optical deflector 5 are enlarged. Disadvantages of cost are hence incurred. The first embodiment of the present invention therefore solves the above problem by effectively using the deflecting facet 5a.

In other words, the apparatus excites the radiation point for radiating the light beam, out of the two light beams emitted from the light source unit 1, which is firstly incident on the deflecting facet 5a of the optical deflector 5 in the main scanning direction, prior to another radiation point.

Specifically, the apparatus firstly excites the radiation point (the second radiation point) 1a for radiating the light beam BMa that reaches the location nearest the center of the deflecting facet 5a, out of the two light beams BMa and BMb reaching the deflecting facet 5a when the light beam is guided to the synchronous detecting unit 10, to perform the synchronous detection (BD detection), and the apparatus then excites the radiation point (the first radiation point) 1b for radiating the light beam BMb that reaches the location away from the center of the deflecting facet 5a, after the optical deflector 5 rotates in the direction of arrow A to move the deflecting facet 5a to a state in which the light beam is no more eclipsed thereby, to perform the synchronous detection.

Here, though locations for achieving the synchronous detection differ between the two light beams BMa and BMb, this difference can be readily coped with by providing slits 10a of the synchronous detecting unit 10 at two places. Alternatively, synchronous detecting units 10 can be provided for the two light beams BMa and BMb, respectively.

FIGS. 6A to 6E schematically illustrate manners in which the two light beams BMa and BMb reach the deflecting facets 5a, respectively. In FIGS. 6A to 6E, like reference numerals designate the same elements as those illustrated in FIG. 1. In the first embodiment, the two light beams BMa and BMb emitted from the light source unit 1 reach different locations on the deflecting facet 5a, respectively.

Figure 6A:
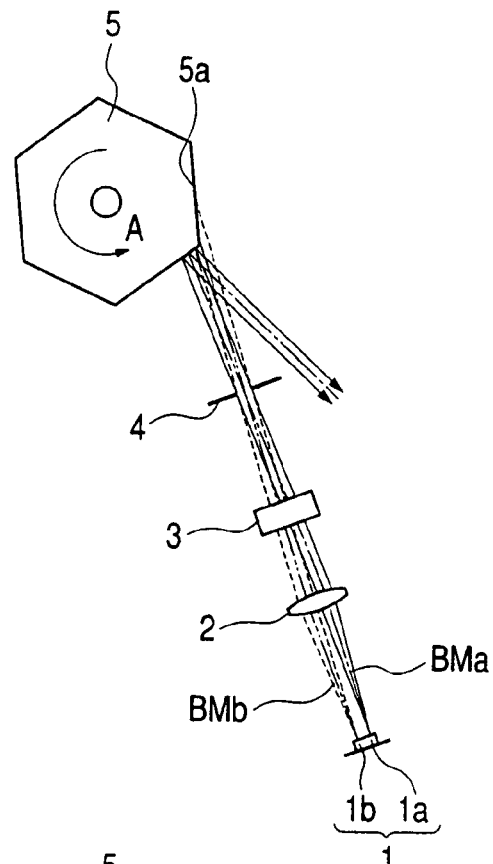
FIG. 6A is a view illustrating a manner in which light beams are deflected in the multi-beam optical scanning apparatus of the first embodiment.

FIG. 6A schematically illustrates the manner in which the light beam BMa from the radiation point (the second radiation point) 1a is deflected and guided to the synchronous unit (not shown). Under this condition, the entire light of the light beam BMa is reflectively deflected by the deflecting facet 5a, while the light beam BMb from the radiation point (the first radiation point) 1b strides end portions of the adjacent deflecting facets 5a and a portion of the light beam BMb is eclipsed.

Figure 6B:
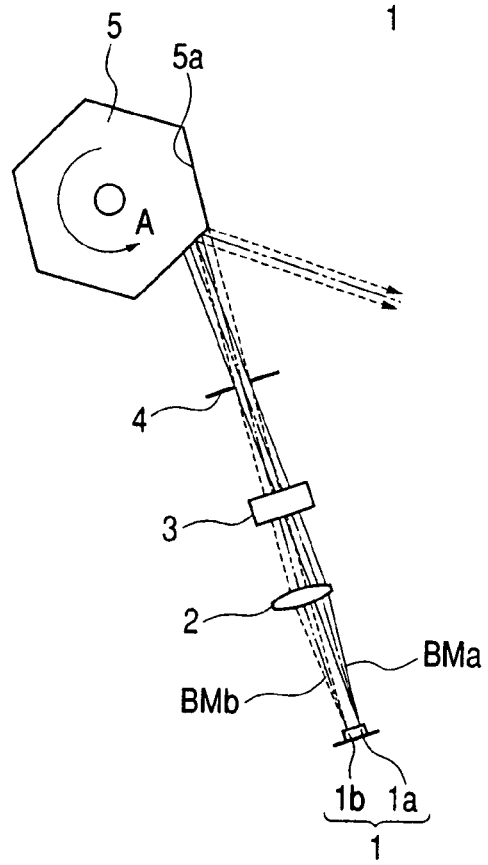
FIG. 6B is a view illustrating a manner in which light beams are deflected in the multi-beam optical scanning apparatus of the first embodiment.

FIG. 6B schematically illustrates the manner in which the light beam BMb is deflected and guided to the synchronous unit (not shown). Under this condition, the entire light of the light beam BMb is also reflectively deflected by the deflecting facet 5a.

Figure 6C:
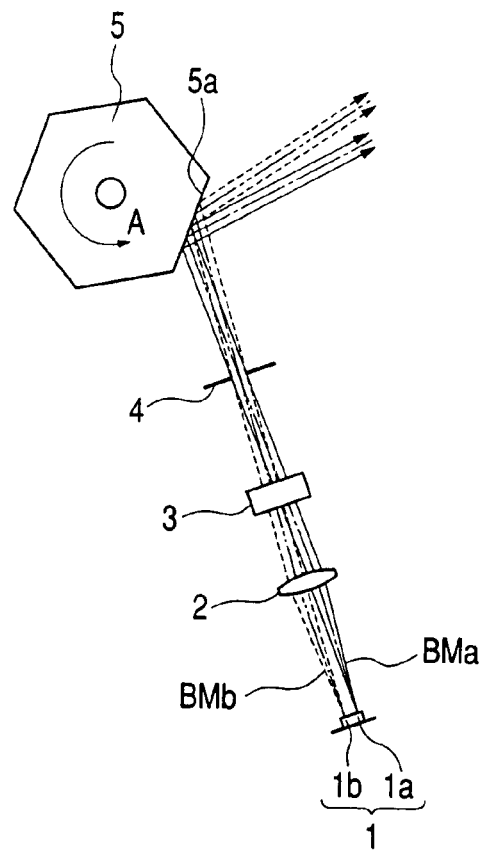
FIG. 6C is a view illustrating a manner in which light beams are deflected in the multi-beam optical scanning apparatus of the first embodiment.

FIG. 6C schematically illustrates the manner in which the two light beams are deflected and guided to an area within the effective scanning range on the scanned surface. Under this condition, both the light beams BMa and BMb reach a place near a central portion of the deflecting facet 5a.

Figure 6D:
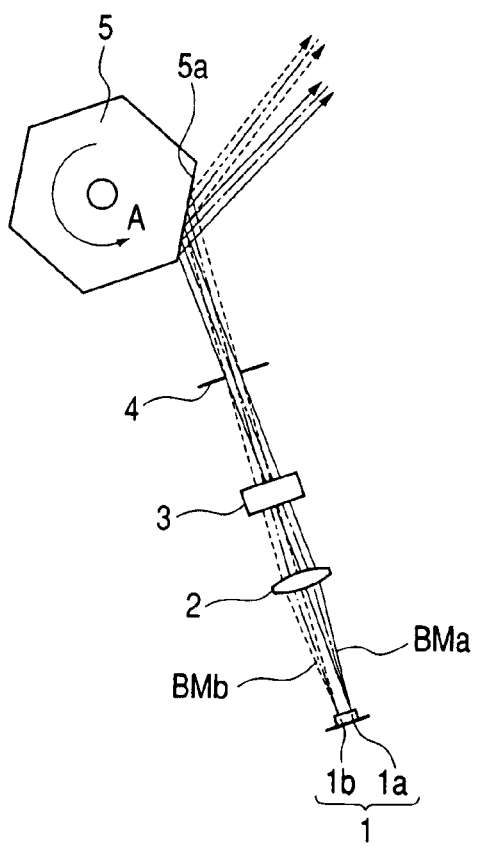
FIG. 6D is a view illustrating a manner in which light beams are deflected in the multi-beam optical scanning apparatus of the first embodiment.

FIG. 6D schematically illustrates the manner in which the two light beams are deflected and guided to a location beyond the effective scanning range on the scanned surface. Under this condition, the light beam BMa (not the light beam BMb) reaches a location away from the center of the deflecting facet 5a, while the light beam BMb (not the light beam BMa) reaches a location near the center of the deflecting facet 5a.

Figure 6E:
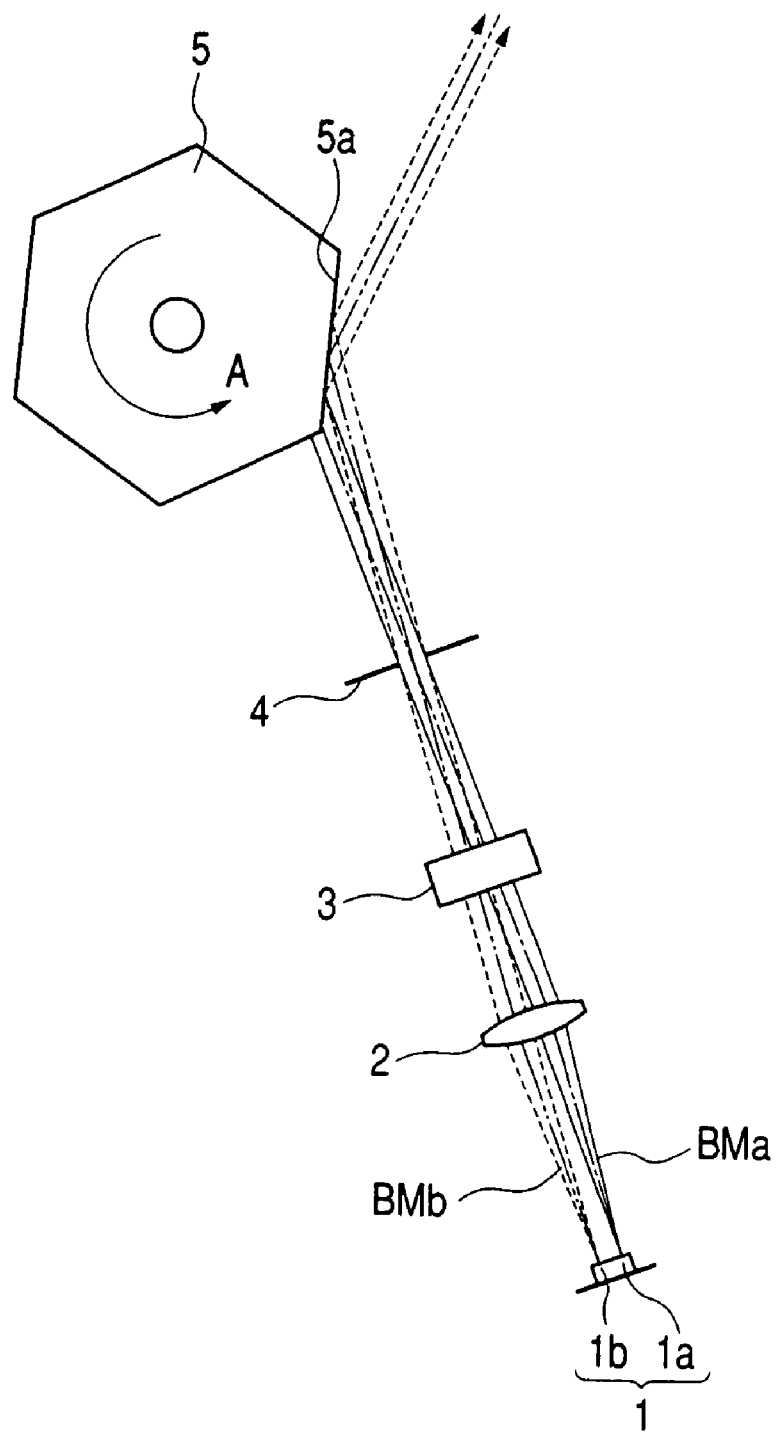
FIG. 6E is a view illustrating a manner in which light beams are deflected in the multi-beam optical scanning apparatus of the first embodiment.

FIG. 6E schematically illustrates a condition immediately after the condition illustrated in FIG. 6D. Under this condition, the light beam BMa strides end portions of the adjacent deflecting facets 5a and a portion of the light beam BMa is eclipsed, while the entire light of the light beam BMb is reflectively deflected by the deflecting facet 5a.

Conditions of FIGS. 6A to 6E occur in a time sequence of FIG. 6A→FIG. 6B→FIG. 6C→FIG. 6D→FIG. 6E. The light beams BMa and BMb move on the deflecting facet 5a in such an order. Although the two light beams BMa and BMb do not actually move, these light beams move relative to the deflecting facet 5a since the optical deflector 5 rotates.

Only the light beam BMa can be reflectively deflected in its entirety under the condition of FIG. 6A, and after a little time elapses and the condition of FIG. 6B is established, the light beam BMb can also be reflectively deflected in its entirety.

In the first embodiment, the synchronous detection is executed at the moment when the entire light beam can be reflectively deflected by the deflecting facet 5a, and radiation order is set for the purposes of synchronous detection in such a manner that the radiation point (the second radiation point) 1a for radiating the light beam BMa is excited in the first place, and the radiation point (the first radiation point) 1b for radiating the light beam BMb is then excited.

Further, in the first embodiment, the two light beams BMa and BMb intersect each other at the aperture stop 4, and only this crossing point is present between the light source unit 1 and the deflecting facet 5a. Accordingly, the number M of crossing points is M=2×n+1=1 (n=0). In this case, a light beam reaching the place near the center of the deflecting facet 5a prior to the scanning start is the light beam BMa from the radiation point 1a located downstream in the rotational direction A of the optical deflector 5, and a light beam reaching the place away from the center of the deflecting facet 5a is the light beam BMb from the radiation point 1b located upstream in the rotational direction A of the optical deflector 5.

Therefore, in the first embodiment, where the first radiation point is defined by the radiation point for radiating the light beam located on the most upstream side in the rotational direction of the optical deflector 5, and the second radiation point is defined by the radiation point for radiating the light beam located on the downstream side, as described above, the second radiation point 1a for radiating the light beam BMa is excited in the first place for the synchronous detection, and the first radiation point 1b for radiating the light beam BMb is then excited for the synchronous detection. Thereby, a stable synchronous detection can be performed without increasing the size of the optical deflector 5, and hence a compact multi-beam scanning apparatus can be achieved with a space of its construction being reduced. Further, an optical deflector similar to that usable in a single-beam apparatus can be employed, and increase in the cost of the driving unit can be oppressed. Thus, advantages in the cost can be obtained.

In other words, utilizing the advantageous effects of the first embodiment, there can be provided a multi-beam scanning apparatus in which the size is reduced, a preferable image can be stably obtained, and the structure is simplified.

As described above, in the first embodiment, the radiation point (the second radiation point) 1a located on the most downstream side in the rotational direction of the optical deflector 5 is excited in the first place for the synchronous detection, and the radiation point (the first radiation point) 1b is then excited for the synchronous detection, thereby effectively using the deflecting facet and reducing the size of the optical deflector. Further, torque necessary for the driving unit for driving the optical deflector can be decreased. Moreover, ghost light can be prevented from occurring due to the chamfered portion of the optical deflector and the like, and hence a preferable image can be always obtained.

Although the BD light beam is present in the external angular range on the upstream side in the above-discussed embodiment, it is possible to situate the BD light beam in the external angular range on the downstream side.

Second Embodiment

Figure 7:
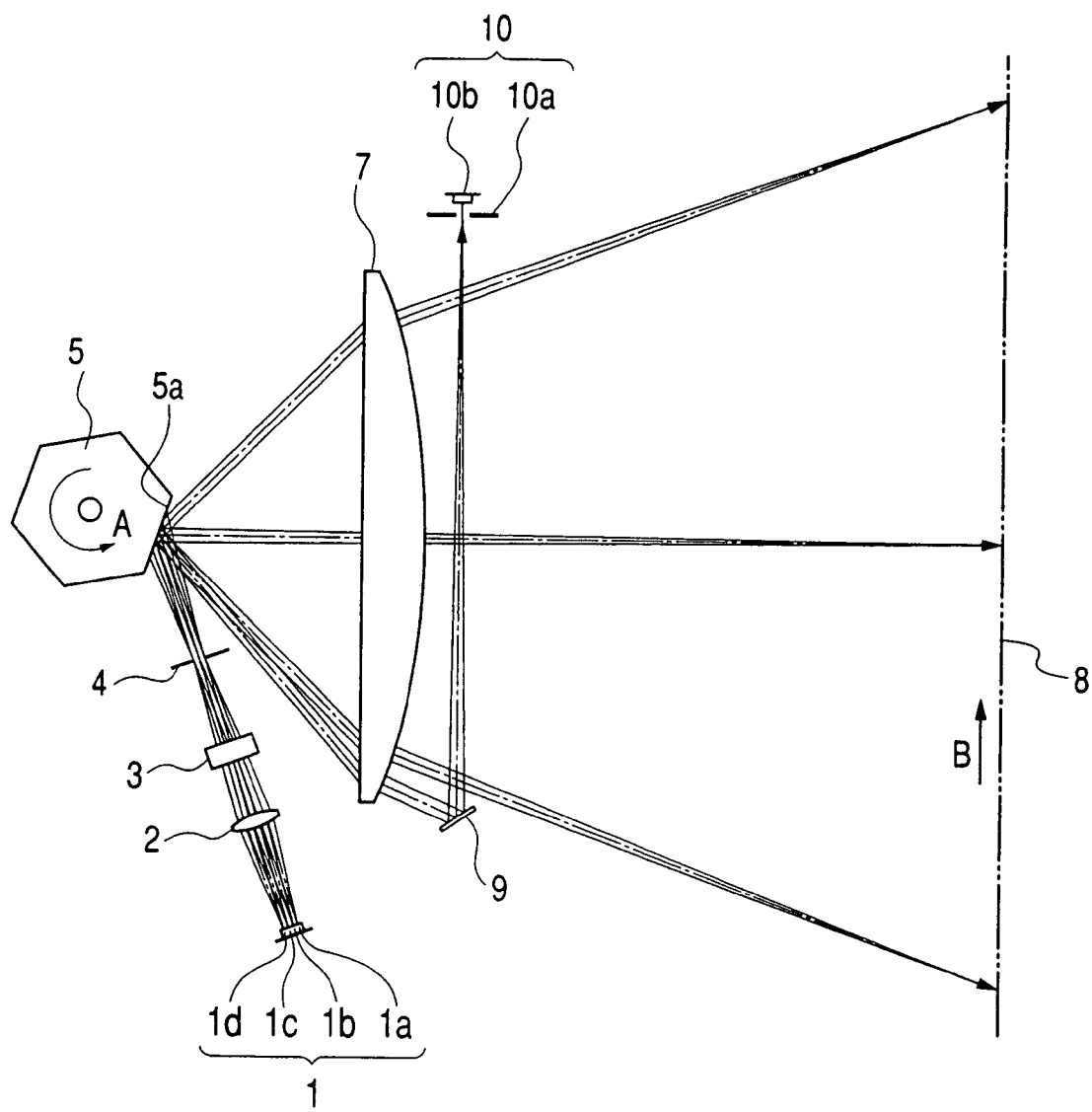
FIG. 7 is a cross-sectional view in a main scanning section illustrating a multi-beam optical scanning apparatus of a second embodiment according to the present invention.

FIG. 7 is a cross-sectional view in the main scanning direction illustrating a multi-beam scanning apparatus of a second embodiment according to the present invention. In FIG. 7, like reference numerals designate the same elements as those illustrated in FIG. 1.

The second embodiment is different from the above-discussed first embodiment in that four radiation points are provided in a light source unit 1. Other construction and optical functions are approximately the same as those of the first embodiment, and similar technical advantages are achieved in the second embodiment.

In FIG. 7, the light source unit 1 is comprised of a monolithic semiconductor laser array having four radiation points 1a, 1b, 1c and 1d, for example. The four points 1a, 1b, 1c and 1d are spaced from each other in both the main scanning direction and the sub scanning direction.

Figure 8:
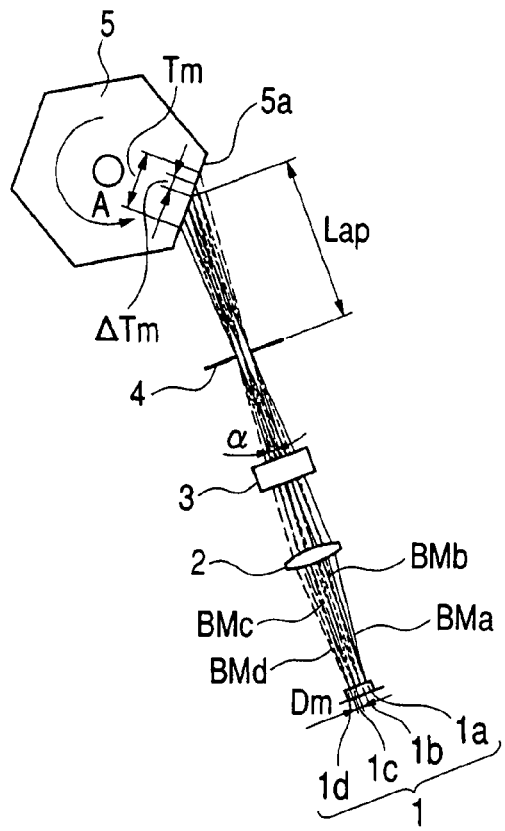
FIG. 8 is a view schematically illustrating a main portion of the multi-beam optical scanning apparatus of the second embodiment.
Figure 9:
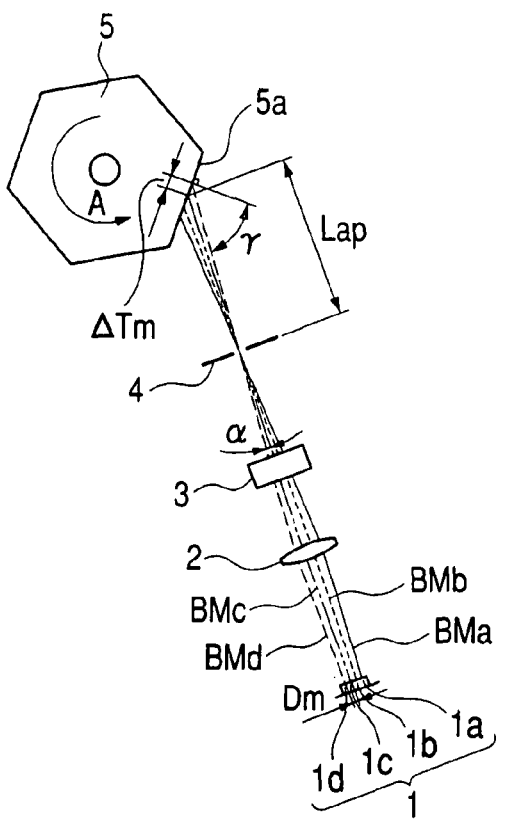
FIG. 9 is a view schematically illustrating a main portion of the multi-beam optical scanning apparatus of the second embodiment.

FIG. 8 schematically illustrates a manner in which four light beams BMa, BMb, BMc and BMd from the light source unit 1 reach the deflecting facet 5a. FIG. 9 is a view illustrating principal rays (central rays of the light beams) of the four light beams BMa, BMb, BMc and BMd illustrated in FIG. 8 only. In FIGS. 8 and 9, like reference numerals designate the same elements as those illustrated in FIG. 7.

In the second embodiment, the four light beams BMa (a solid line), BMb (a shorter dashed line), BMc (an alternate long and two short dashes line) and BMd (a longer dashed line) emitted from the light source unit 1 intersect each other at the aperture stop 4, and enter the deflecting facet 5a of the optical deflector 5. Also in the second embodiment, the light beams intersect each other only once in a range between the light source unit 1 and the deflecting facet 5a of the optical deflector 5.

The diameter of an inscribed circle of the optical deflector 5 is 40 mm in the second embodiment.

In the second embodiment, similar to the first embodiment, the four light beams BMa, BMb, BMc and BMd are incident on the deflecting facet 5a at different incident angles, so that principal rays of the four light beams BMa, BMb, BMc and BMd reach different locations on the deflecting facet 5a of the optical deflector 5 serving as the rotational polygon mirror. Accordingly, the four light beams BMa, BMb, BMc and BMd reach the deflecting facet 5a over a wide range in the main scanning section.

Here, a spread Tm (mm) of the four light beams BMa, BMb, BMc and BMd reaching the deflecting facet 5a will be discussed. In the second embodiment, the spread Tm is larger than that of the two light beams BMa and BMb in the first embodiment, and hence the problem of eclipse of the light beam by the deflecting facet 5a is more outstanding in the second embodiment. That is, the larger the number of the light beams, the longer the magnitude of the spread Tm. Accordingly, the problem of the eclipse at the end portion of the deflecting facet 5a must be treated and solved.

The spread Tm (mm) of the four light beams can be represented as follows, using the width Wm (mm) of the light beam in the main scanning direction, the deviation $\Delta Tm$ (mm) between the adjacent light beams, the number n of the light beams, and the incident angle $\gamma$ (rad) of the light beam incident on the deflecting facet 5a $$Tm = \frac{Wm + (n-1) \times \Delta Tm}{\cos\gamma} \qquad \text{relation 3}$$

The four light beams BMa, BMb, BMc and BMd emitted from the respective radiation points 1a, 1b, 1c and 1d are not parallel, and form an angle $\alpha$ therebetween. In the main scanning direction subsequent to the light condensing lens system 2, the angle $\alpha$ (rad) between the adjacent light beams can be written as follows, using the distance Dm (mm) in the main scanning direction between the adjacent radiation points, and the focal length fcol (mm) of the light condensing lens system 2

$$\alpha = \frac{Dm}{fcol} \qquad \text{relation 4}$$

The light beams emerge from the light condensing lens system 2, pass through the cylindrical lens 3, form the angle $\alpha$ therebetween and intersect each other at the time when reaching the aperture stop 4, and enter the optical deflector 5 with the angle $\alpha$ being maintained.

In connection with the deviation $\Delta Tm$ (mm) between the adjacent light beams, the distance Lap (mm) between a location of beam-intersection locations nearest to the deflecting facet 5a and the deflecting facet 5a is important. In the second embodiment, the location of the beam-intersection locations nearest to the deflecting facet 5a is the location of the aperture stop 4. The aperture stop 4 cannot be disposed in the vicinity of the deflecting facet 5a due to physical reasons of the structure.

Here, the deviation $\Delta Tm$ (mm) between the adjacent light beams can be represented as follows, using the distance Lap (mm) between the aperture stop 4 and the deflecting facet 5a, and the angle $\alpha$ (rad) between the adjacent light beams $$\Delta Tm = Lap \times \alpha \qquad \text{relation 5}$$

The spread Tm (mm) of the four light beams can be given from relations 6 and 5

$$Tm = \frac{Wm + (n-1) \times Lap \times \alpha}{\cos\gamma} \qquad \text{relation 6}$$

Alternatively, the deviation $\Delta Tm$ (mm) between the adjacent light beams can be given from relations 4 and 5

$$\Delta Tm = \frac{Lap \times Dm}{fcol} \qquad \text{relation 7}$$

Accordingly, the spread Tm (mm) of the four light beams can be given from relations 3 and 7

$$Tm = \frac{Wm + (n-1) \times Lap \times Dm}{\cos\gamma \times fcol} \qquad \text{relation 8}$$

To paraphrase the above, in the multi-beam scanning apparatus having four radiation points spaced apart in the main scanning direction, the spread Tm (mm) of the four light beams on the deflecting facet 5a increases by amounts of deviation between the adjacent light beams, and therefore a larger deflecting facet 5a is needed therein than in the single-beam scanning apparatus. This means that the size of the optical deflector 5 increases, the size of the multi-beam scanning apparatus increases, and torque of the motor for the polygon mirror should be enlarged in order to speedily rotate a large heavy optical deflector (a polygon mirror), leading to the problem of increase in the cost. Further, the size of the deflecting facet 5a needs to be enlarged as the number n of the light beams increases.

Therefore, in the second embodiment, since the light beam BMd emitted from the radiation point (the first radiation point) 1d arranged on the most upstream side in the rotational direction A of the optical deflector 5 reaches the location most remote from the center of the deflecting facet 5a, another light beam is radiated in the first place. It is preferable to radiate the light beam reaching the place nearest the center of the deflecting facet 5a, and accordingly the radiation point (the fourth radiation point) 1a disposed on the most downstream side in the rotational direction A of the optical deflector 5 is excited in the first place for the synchronous detection. Next, the light beam from the radiation point (the third radiation point) 1b is radiated, the light beam from the radiation point (the second radiation point) 1*c* is then radiated, and the light beam from the radiation point (the first radiation point) 1*d* is last radiated. Thus, light radiation is sequentially executed from the radiation point 1*a* disposed on the most downstream side in the rotational direction A of the optical deflector 5 to achieve the synchronous detection.

In other words, the deflecting facet 5*a* can be effectively used when the light beam other than the light beam reaching the location most remote from the center of the deflecting facet 5*a* of the optical deflector 5 is radiated in the first place. It is preferable to excite the radiation point (the fourth radiation point) 1*a* for radiating the light beam reaching the location nearest the center of the deflecting facet 5*a* in the first place. It is more preferable to sequentially excite the radiation points beginning with the radiation point (the fourth radiation point) 1*a* for radiating the light beam reaching the location nearest the center of the deflecting facet 5*a*.

The deflecting facet 5*a* of the optical deflector 5 serving as the rotational polygon mirror can be thus effectively employed, and a small-sized optical deflector 5 can be used. Increase in the cost of the driving unit, such as the motor, can also be prevented. Namely, downsizing of the optical deflector 5 and reduction in the cost can be achieved.

Though the number of light beams to be scanned at a time is four in the above-discussed apparatus, the present invention can also be applied to apparatuses using five or more light beams. The same or more advantageous effects can also be obtained in such multi-beam scanning apparatuses using multiple light beams such as eight light beams, sixteen light beams, or thirty-two light beams.

Third Embodiment

Figure 10:
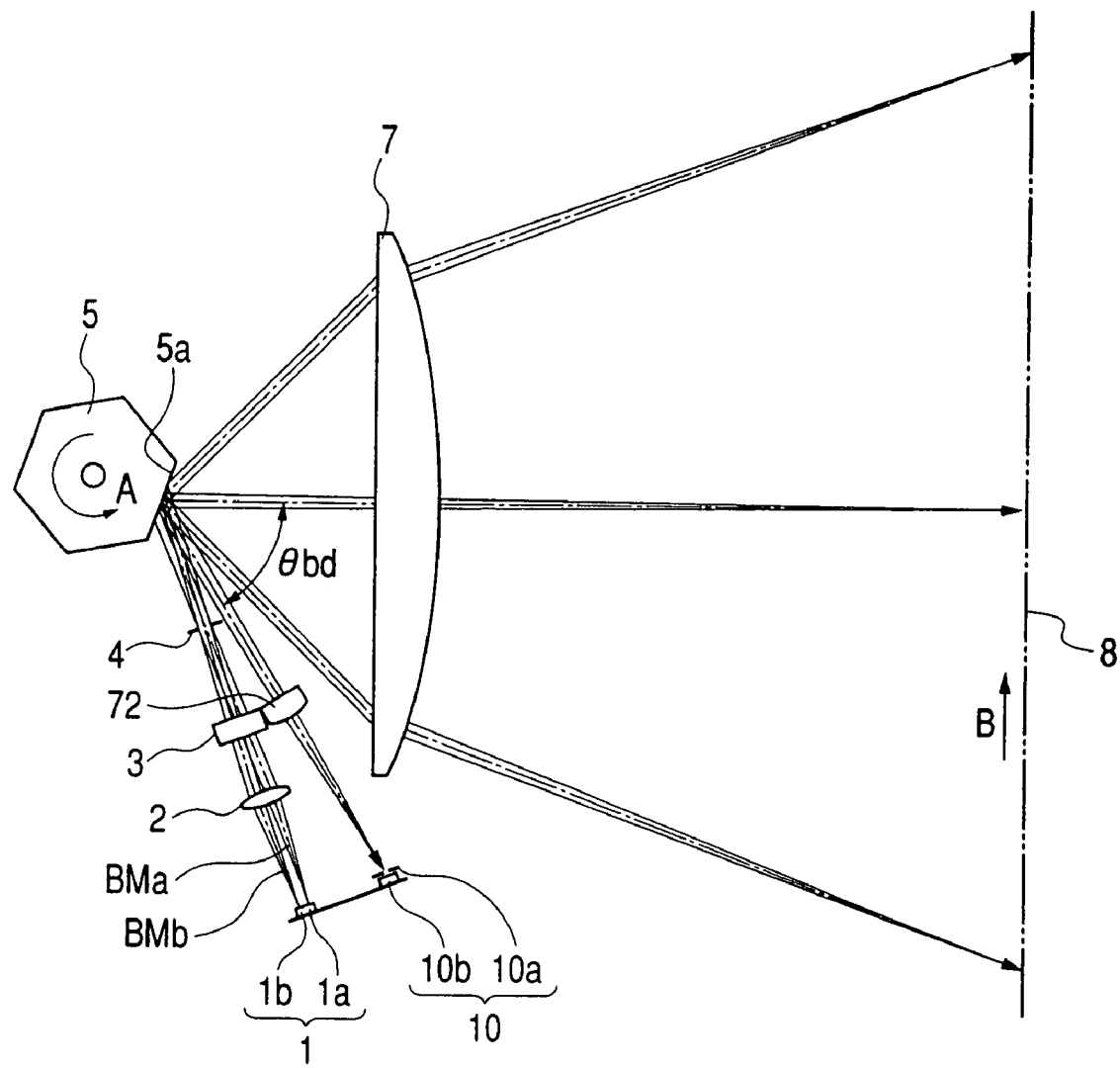
FIG. 10 is a cross-sectional view in a main scanning section illustrating a multi-beam optical scanning apparatus of a third embodiment according to the present invention.

FIG. 10 is a cross-sectional view in the main scanning direction illustrating a multi-beam scanning apparatus of a third embodiment according to the present invention. In FIG. 10, like reference numerals designate the same elements as those illustrated in FIG. 1.

The third embodiment is different from the above-discussed first embodiment in that a light beam (a BD light beam) deflected and guided to a synchronous detecting unit 10 by the optical deflector 5 serving as the rotational polygon mirror does not pass through the scanning lens 7, and is instead transmitted through another lens (a synchronous detecting optical system) 72 and is guided to the synchronous detecting unit 10. Other construction and optical functions are approximately the same as those of the first embodiment, and similar technical advantages are achieved in the third embodiment.

In FIG. 10, the synchronous detecting optical system 72 is comprised of a single lens (a BD lens) having anamorphic refractive power. The synchronous detecting optical system 72 forms images of the two BD light beams on the surface of a BD slit 10*a* provided near a BD sensor 10*b*.

In the third embodiment, the BD lens 72 other than the scanning lens 7 is provided in the optical path from the optical deflector 5 to the synchronous detecting unit 10, and the focal length of the BD lens 72 is set shorter than the scanning lens 7, so that the length of the optical path from the optical deflector 5 to the synchronous detecting unit 10 can be made short.

Further, since the BD slit 10*a* of the synchronous detecting unit 10 is disposed on the optical axis of the BD lens 72, the synchronous detection can be accomplished without any adverse influence due to difference in wavelengths of the light beams which is the problem specific to the multi-beam apparatus. Accordingly, the scanning start position can be stabilized. Further, in the event that the radiation points 1*a* and 1*b* and the BD sensor 10*b* are arranged on a common substrate, the number of components and arrangement space can be reduced. Furthermore, when the BD lens 72 and the cylindrical lens 3 are formed with a plastic lens in a united form, the cost can be reduced.

It is thus greatly advantageous to provide the BD lens 72 separate from the scanning lens 7 in the optical path between the optical deflector 5 and the synchronous detecting unit 10.

In the third embodiment, however, as compared with the multi-beam scanning apparatus as described in the first embodiment in which the light beam transmitted through the scanning lens 7 is guided to the synchronous detecting unit 10, it is necessary to widen an angle θbd (an angle of view) at the time when the two light beams BMa and BMb emitted from the light source unit 1 are deflected toward the synchronous unit 10 by the optical deflector 5, such that these two light beams can be prevented from being guided to the scanning lens 7. Accordingly, a use range of the deflecting facet 5*a* of the optical deflector 5 inevitably increases. Therefore, the light beam reaching the deflecting facet 5*a* is further likely to get to a place more remote from the center of the deflecting facet 5*a*, and the optical deflector 5 needs to be enlarged.

Also in the third embodiment, such problem is solved by appropriately determining the radiation order of the radiation points for the synchronous detection, similar to the above-discussed first embodiment.

In the third embodiment, the two light beams BMa and BMb emitted from the light source unit 1 intersect each other at the aperture stop 4, the light beams intersect each other only once in a range between the light source unit 1 and the deflecting facet 5*a*. Accordingly, the radiation point 1*a* (the second radiation point) for radiating the light beam BMa disposed on the downstream side in the rotational direction A of the optical deflector 5 is excited in the first place to perform the synchronous detection, and the radiation point 1*b* (the first radiation point) for radiating the light beam BMb disposed on the upstream side in the rotational direction of the optical deflector 5 is then excited to perform the synchronous detection.

Thus, also in the multi-beam scanning apparatus provided with the optical path directed to the synchronous detecting unit 10 separately from the optical path directed to the scanning lens 7, the synchronous detection can be stably performed without need of increasing the size of the optical deflector 5.

Fourth Embodiment

Figure 11:
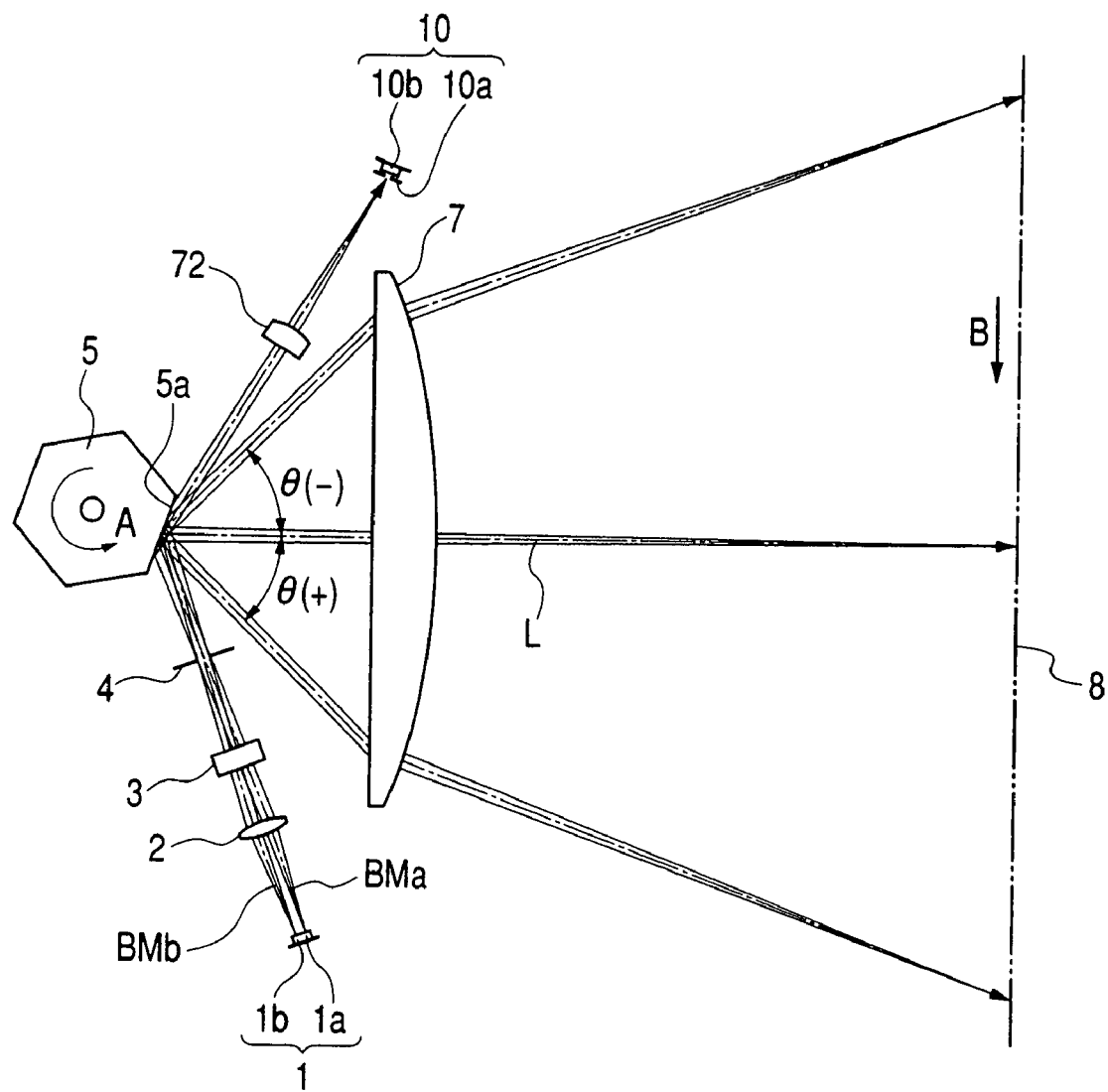
FIG. 11 is a cross-sectional view in a main scanning section illustrating a multi-beam optical scanning apparatus of a fourth embodiment according to the present invention.

FIG. 11 is a cross-sectional view in the main scanning direction illustrating a multi-beam scanning apparatus of a fourth embodiment according to the present invention. In FIG. 11, like reference numerals designate the same elements as those illustrated in FIG. 1.

The fourth embodiment is different from the above-discussed first embodiment in that an optical deflector 5 serving as the rotational polygon mirror is rotated in a reverse direction, and a synchronous detecting unit 10 and an optical system (a BD lens) 72 for synchronous detection are disposed on a side opposite to the light source unit 1 with respect to the optical axis L of the scanning lens 7. Other construction and optical functions are approximately the same as those of the first embodiment, and similar technical advantages are achieved in the fourth embodiment.

In the multi-beam scanning apparatus of the fourth embodiment in FIG. 11, the light source unit 1 includes two radiation points 1*a* and 1*b* spaced from each other in the main scanning direction, and two light beams BMa and BMb emitted from the respective radiation points 1a and 1b are transmitted through the light condensing lens 2 and the cylindrical lens 3, intersect each other at the aperture stop 4, and are incident on the deflecting facet 5a of the optical deflector 5.

In the fourth embodiment, the optical deflector 5 is rotated at a uniform speed in a direction of an arrow A (a direction opposite to the direction of the first embodiment) in FIG. 11, and the two light beams BMa and BMb emitted from the light source unit 1 are scanned in a direction of an arrow B on the photosensitive drum surface 8. A portion (the BD light beam) of the light beam deflected by the optical deflector 5 is transmitted through the BD lens 72 and guided to the synchronous detecting unit 10 such that the scanning start position in the main scanning direction on the photosensitive drum surface 8 can be determined.

Here, in the event that the light beam emitted from the light source unit 1 is deflected by the optical deflector 5, a side of deflection on the side of the light source unit 1 with respect to the optical axis L of the scanning lens 7 is a "plus" side, and a side of deflection on a side opposite to the light source unit 1 with respect to the optical axis L of the scanning lens 7 is a "minus" side.

When the light beam emitted from the light source unit 1 is deflected on the minus side θ(−) by the optical deflector 5, the light beam from the light source unit 1 reaches a place more away from the center of the deflecting facet 5a than when the light beam is deflected on the plus side θ(+) by the optical deflector 5. In other words, room of the deflecting facet 5a of the optical deflector 5 is smaller on the minus side θ(−) than on the plus side θ(+).

In the multi-beam scanning apparatus constructed such that the light beam from the light source unit 1 is deflected on the minus side by the optical deflector 5 when guided to the synchronous detecting unit 10 as in the fourth embodiment, room is short on the deflecting facet 5a, and the light beam is more likely to be eclipsed.

In the fourth embodiment, therefore, the radiation order of the light beams during the synchronous detection is appropriately set such that the synchronous detection can be stably performed without any eclipse.

Figure 12A:
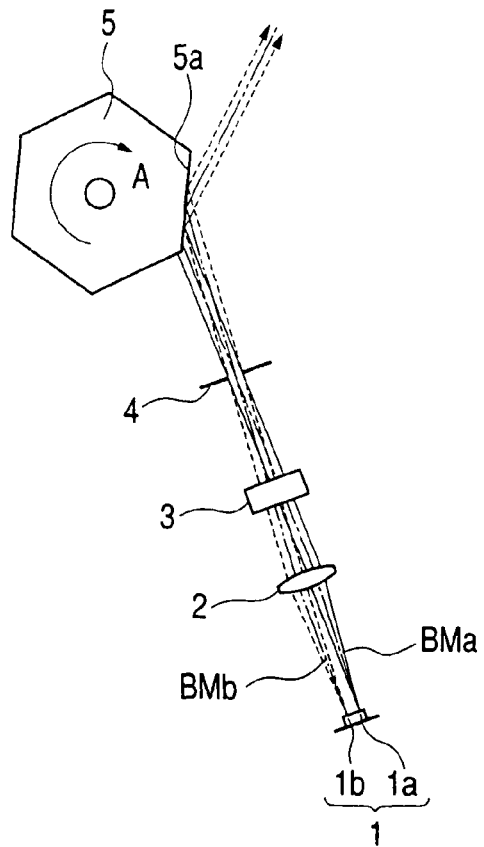
FIG. 12A is a view illustrating a manner in which light beams are deflected in the multi-beam optical scanning apparatus of the fourth embodiment.
Figure 12B:
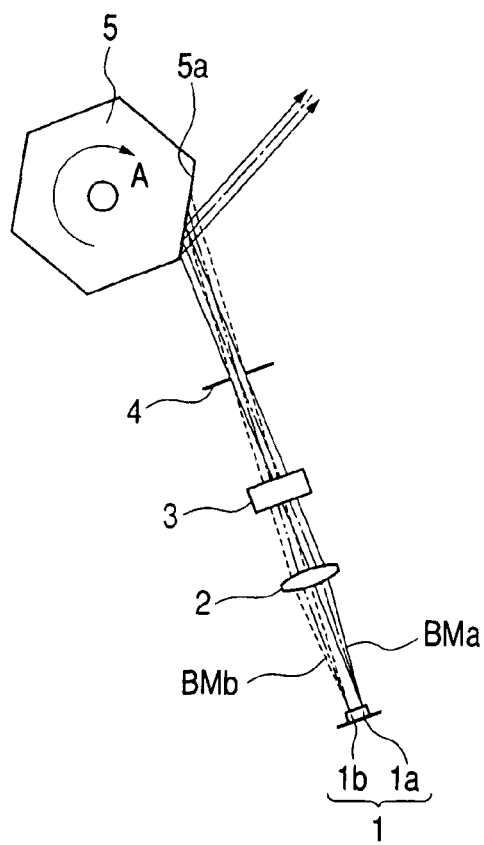
FIG. 12B is a view illustrating a manner in which light beams are deflected in the multi-beam optical scanning apparatus of the fourth embodiment.

FIGS. 12A and 12B illustrate manners in which the two light beams BMa and BMb reach the deflecting facet 5a, respectively. In FIGS. 12A and 12B, like reference numerals designate the same elements as those illustrated in FIG. 1. In the fourth embodiment, the two light beams BMa and BMb emitted from the light source unit 1 reach different locations on the deflecting facet 5a.

FIG. 12A illustrates a manner in which the light beam BMb (indicated by a dashed line) is deflected toward the synchronous detecting unit (not shown). The light beam BMa (indicated by a solid line) strides end portions of the adjacent deflecting facets 5a and a portion thereof is eclipsed, while the entire light beam BMb (indicated by the dashed line) is reflectively deflected by the deflecting facet 5a.

FIG. 12B illustrates a manner in which the light beam BMa (indicated by the solid line) is deflected toward the synchronous detecting unit a little after the state of FIG. 12A. The entire light beam BMb (indicated by the dashed line) is also reflectively deflected by the deflecting facet 5a.

In the fourth embodiment, the arrangement of the radiation points is the same as the third embodiment with the exception that the radiation point (the first radiation point) 1a and the radiation point (the second radiation point) 1b are disposed on the upstream side and the downstream side in the rotational direction, respectively. Accordingly, the radiation point 1b for radiating the light beam BMb is radiated in the first place to perform the synchronous detection, and the radiation point 1a for radiating the light beam BMa is then radiated to perform the synchronous detection.

Thus, in the fourth embodiment, the deflecting facet 5a of the optical deflector 5 can be effectively used, and increase in the size of the optical deflector 5 can be prevented also in the event that deflection is conducted beyond the effective scanning range on the minus side. In other words, the optical deflector can be downsized, and a compact multi-beam scanning apparatus can be achieved at relatively low costs.

Fifth Embodiment

Figure 13:
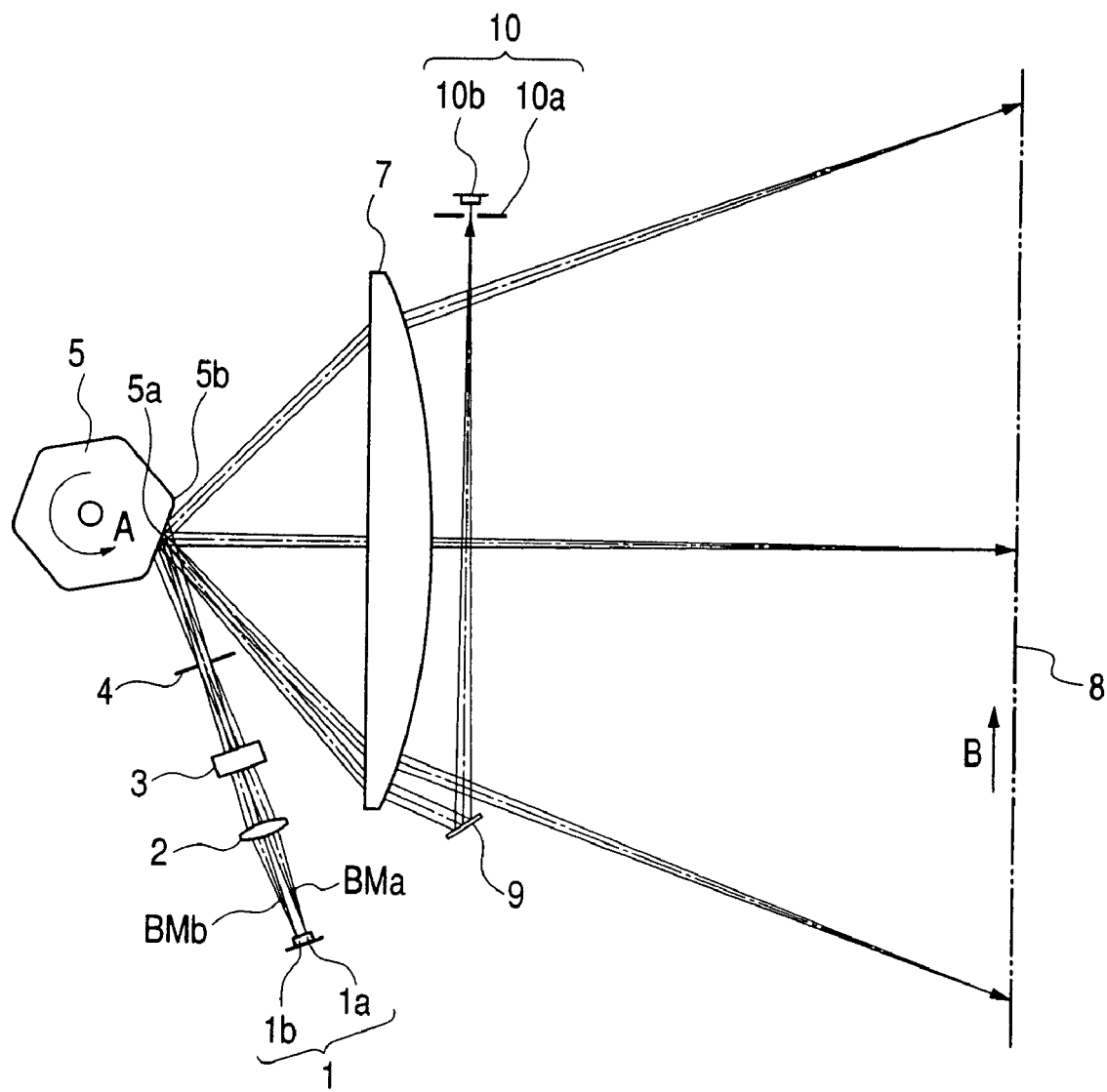
FIG. 13 is a cross-sectional view in a main scanning section illustrating a multi-beam optical scanning apparatus of a fifth embodiment according to the present invention.

FIG. 13 is a cross-sectional view in the main scanning direction illustrating a multi-beam scanning apparatus of a fifth embodiment according to the present invention. In FIG. 13, like reference numerals designate the same elements as those illustrated in FIG. 1.

The fifth embodiment is different from the above-discussed first embodiment in that chamfered portions 5b are formed at ends (ridges) of the deflecting facets 5a of the optical deflector 5 serving as the rotational polygon mirror. Other construction and optical functions are approximately the same as those of the first embodiment, and similar technical advantages are achieved in the fifth embodiment.

In the multi-beam scanning apparatus of the fifth embodiment in FIG. 13, two radiation points 1a and 1b of the light source unit 1 for radiating light beams BMa and BMb are started to be excited immediately before each light beam is guided to the synchronous detecting unit 10 (to the upstream-side external angular range), and the radiation amount is regulated (APC). After the radiation amount is regulated to a desired value by the APC and stabilized, the light beam is guided to the synchronous detecting unit 10 to stably perform the synchronous detection.

In the fifth embodiment, the light source unit 1 is comprised of a monolithic semiconductor laser array in which radiation amounts of light beams emitted from two radiation points 1a and 1b are measured by a measuring device provided in the laser device. The radiation amounts are adjusted to desired values based on measured results supplied from the measuring device.

The chamfered portion 5b can be provided at the end portion of the deflecting facet 5a of the optical deflector 5 as a chucking portion of the optical deflector 5 at the time of its fabrication, or for the purposes of reducing wind whistling sound of the optical deflector. In the fifth embodiment, the chamfered portion 5b is formed along a circle with a diameter of 39 mm which is a little smaller than the diameter 40 mm of the circumscribed circle of the optical deflector 5.

In recent years, the angle of view of the scanning lens 7 tends to increase as the size of the multi-beam scanning apparatus decreases, and accordingly there is only a small room on the deflecting facet 5a of the optical deflector 5. Particularly, a portion close to the end of the deflecting facet 5a is often used in the event that the light beam is guided to the synchronous detecting unit 10 provided outside the effective scanning range on the photosensitive drum surface 8.

The APC (auto power control) is generally performed immediately before the synchronous detection. There is a case where the light beam is emitted from the light source unit 1 to perform the APC under a condition under which the light beam threatens to be eclipsed by the deflecting facet 5a of the optical deflector 5, but no problem occurs even unless the light beam is incident on the optical deflector 5 because measurement of the light amount in the APC is executed in the laser device.

Figure 14:
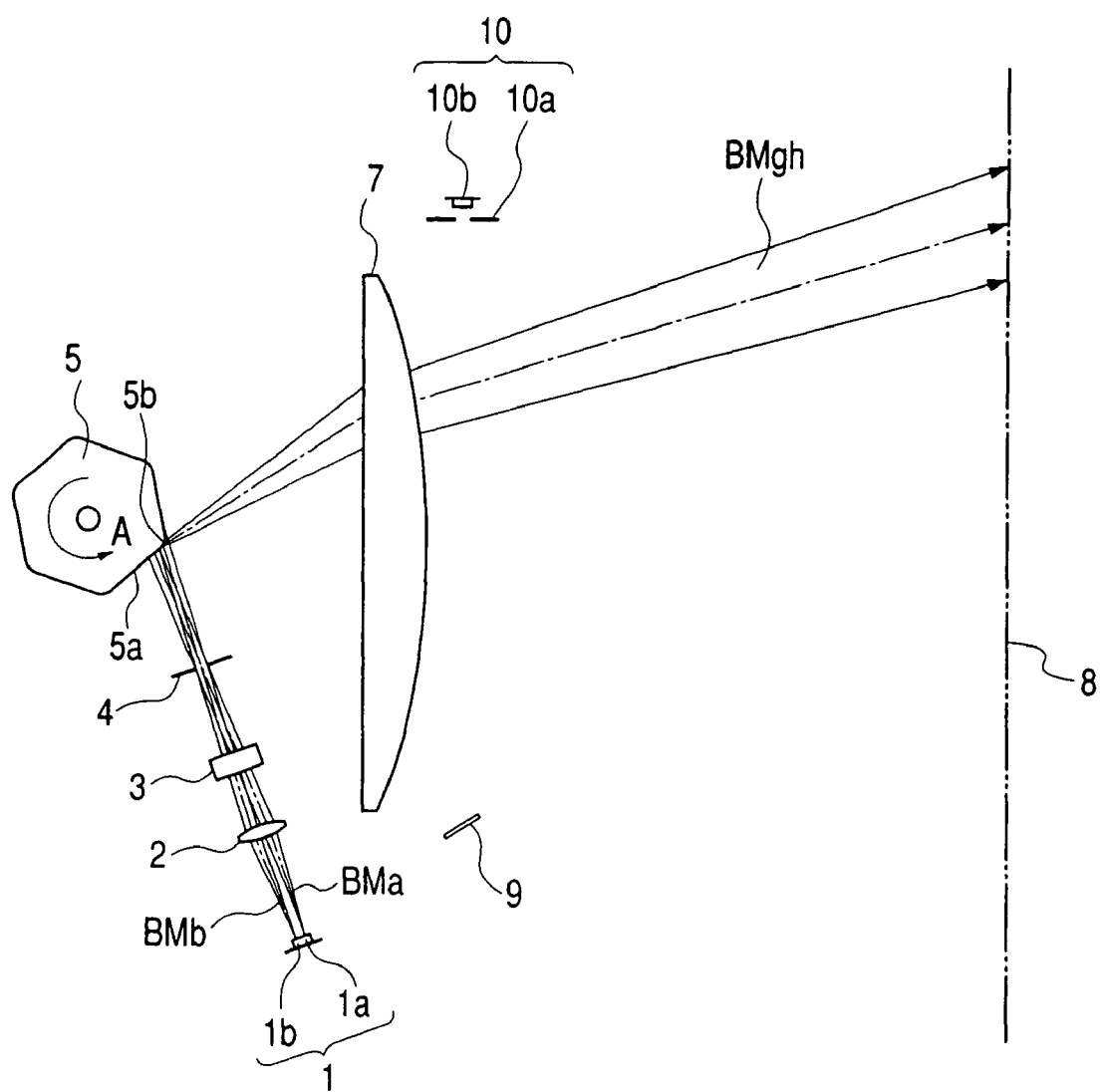
FIG. 14 is a view schematically illustrating a main portion of the multi-beam optical scanning apparatus of the fifth embodiment.

However, when the chamfered portion 5*b* is formed at the end portion of the deflecting facet 5*a* of the optical deflector 5, room of the deflecting facet 5*a* is likely to be still smaller. FIG. 14 is a cross-sectional view in the main scanning direction illustrating ghost light BMgh appearing at the chamfered portion 5*b* of the optical deflector 5.

As illustrated in FIG. 14, the light beam emitted from the light source unit 1 strides over the chamfered portion 5*b*, and the ghost light beam BMgh reflected by the chamfered portion 5*b* reaches the photosensitive drum surface 8. Thus, the problem of black streaks of an image is likely to occur.

In the fifth embodiment, therefore, the radiation order of the light beams is likewise appropriately designed during the time of APC to prevent the occurrence of the ghost light BMgh due to the chamfered portion 5*b*.

Figure 15A:
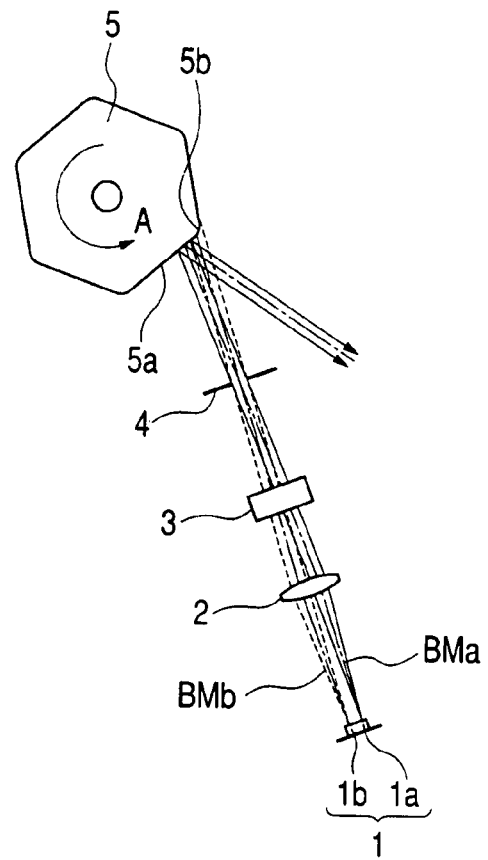
FIG. 15A is a view illustrating a manner in which light beams are deflected in the multi-beam optical scanning apparatus of the fifth embodiment.
Figure 15B:
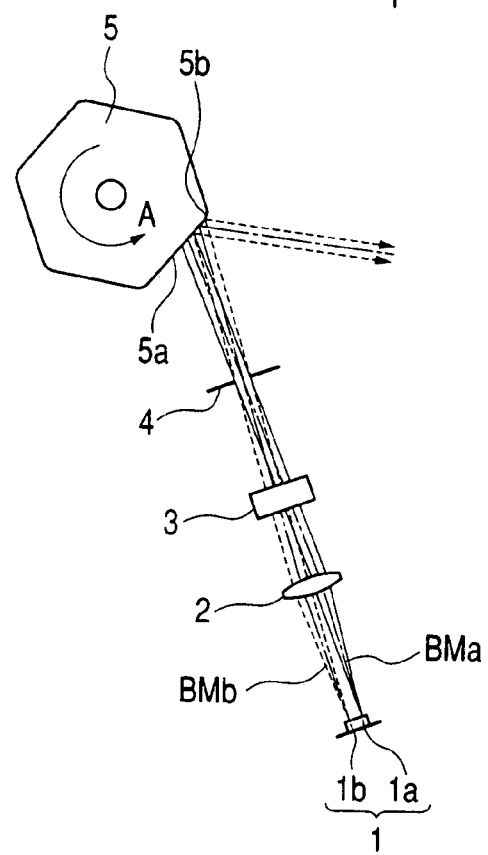
FIG. 15B is a view illustrating a manner in which light beams are deflected in the multi-beam optical scanning apparatus of the fifth embodiment.

FIGS. 15A and 15B illustrate manners in which the two light beams BMa and BMb reach the deflecting facet 5*a*, respectively. In FIGS. 15A and 15B, like reference numerals designate the same elements as those illustrated in FIG. 1. In the fifth embodiment, the two light beams BMa and BMb emitted from the light source unit 1 reach different locations on the deflecting facet 5*a*.

As illustrated in FIG. 15A, out of the two light beams BMa and BMb emitted from the light source unit 1, the radiation point (the second radiation point) 1*a* for radiating the light beam BMa reaching the location nearest the center of the deflecting facet 5*a* of the optical deflector 5 is excited in the first place to perform the APC under a condition under which the light beam does not stride over the chamfered portion 5*b* of the deflecting facet 5*a*. Then, as illustrated in FIG. 15B, the other radiation point (the first radiation point) 1*b* for radiating the light beam BMb is excited to perform the APC at the moment when the optical deflector 5 is rotated so as to establish the condition under which the light beam does not stride over the chamfered portion 5*b* of the deflecting facet 5*a*.

In the fifth embodiment, the two light beams BMa and BMb emitted from the two radiation points 1*a* and 1*b* of the light source unit 1 intersect each other only once in a range between the light source unit 1 and the optical deflector 5. The radiation point (the second radiation point) 1*a* for radiating the light beam BMa disposed on the downstream side in the rotational direction A of the optical deflector 5 is excited in the first place, and the radiation point (the first radiation point) 1*b* for radiating the light beam BMb disposed on the upstream side in the rotational direction is then excited.

There can thus be provided a multi-beam scanning apparatus capable of always obtaining a favorable image without any ghost while using a compact optical deflector 5. Here, the radiation order of the light beams for the synchronous detection is opposite to that for the APC.

The time sequence of the radiation order is as follows. The radiation point 1*a* for radiating the light beam BMa is initially excited to perform the APC, and is then turned off. The radiation point 1*b* for radiating the light beam BMb is then excited to perform the APC, and the synchronous detection is performed with its radiation being maintained. The radiation point 1*a* for radiating the light beam BMa is last re-excited to perform the synchronous detection.

The synchronous detection is thus performed after the APC operation, and the light beam is not eclipsed by the deflecting facet 5*a* also during the synchronous detection since the light beam is not eclipsed by the deflecting facet 5*a* during the APC time. Thus, the synchronous detection can be stably performed. Thereby, since a synchronous detecting unit with a convention structure can be used without any change, it is possible to advantageously utilize a single-beam scanning apparatus in a diversion way.

The number of the radiation points is two in the fifth embodiment, but the number is not limited thereto. The present invention can also be applied to multi-beam scanning apparatuses using three or more radiation points. The same or more advantageous effects can also be obtained in such multi-beam scanning apparatuses using multiple radiation points such as four radiation points, eight radiation points, or sixteen radiation points.

In the fifth embodiment, the ghost light beam occurring due to the chamfered portion 5*b* is handled, but other cases can be likewise handled. For example, even in the event that it is designed to prevent influence of the ghost light beam reflected by the adjacent deflecting facet due to light radiation at the time of APC, the same advantageous effects as those of the above-discussed fifth embodiment can be obtained in the present invention.

Sixth Embodiment

Figure 16:
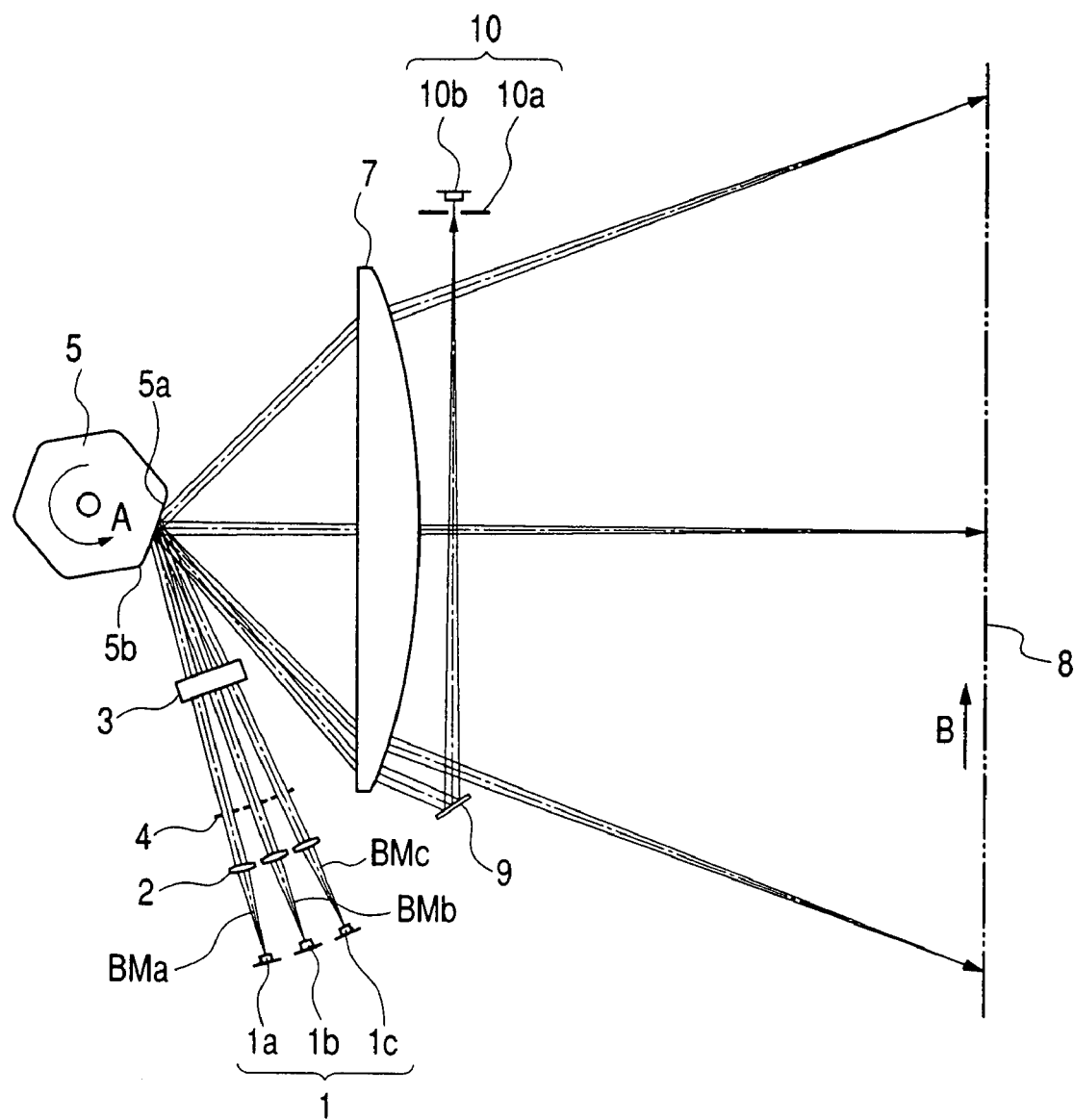
FIG. 16 is a cross-sectional view in a main scanning section illustrating a multi-beam optical scanning apparatus of a sixth embodiment according to the present invention.

FIG. 16 is a cross-sectional view in the main scanning direction illustrating a multi-beam scanning apparatus of a sixth embodiment according to the present invention. In FIG. 16, like reference numerals designate the same elements as those illustrated in FIG. 1.

The sixth embodiment is different from the above-discussed first embodiment in that three radiation points are provided in a light source unit 81, three light beams BMa, BMb and BMc emitted from the radiation points 1*a*, 1*b* and 1*c* are incident on the deflecting facet 5*a* without intersecting each other between the light source unit 1 and the deflecting facet 5*a*, and the chamfered portion 5*b* is formed at the end of the deflecting facet 5*a* of the optical deflector 5 serving as the rotational polygon mirror. Other construction and optical functions are approximately the same as those of the first embodiment, and similar technical advantages are achieved in the sixth embodiment.

In the sixth embodiment, the light source unit 1 is comprised of a monolithic semiconductor laser array with three radiation points 1*a*, 1*b* and 1*c*. The three radiation points 1*a*, 1*b* and 1*c* are spaced from each other in both the main scanning direction and the sub scanning direction.

In the sixth embodiment, the three light beams BMa, BMb and BMc emitted from the radiation points 1*a*, 1*b* and 1*c* are incident on the deflecting facet 5*a* without intersecting each other between the light source unit 1 and the deflecting facet 5*a*. A portion (a BD light beam) of the light beam reflectively deflected by the deflecting facet 5*a* is guided to the synchronous unit 10 through the BD mirror 9 such that the scanning start timing in the main scanning direction on the scanned surface 8 can be determined. Further, the optical deflector 5 is provided with the chamfered portion 5*b* similar to the fifth embodiment.

Figure 17A:
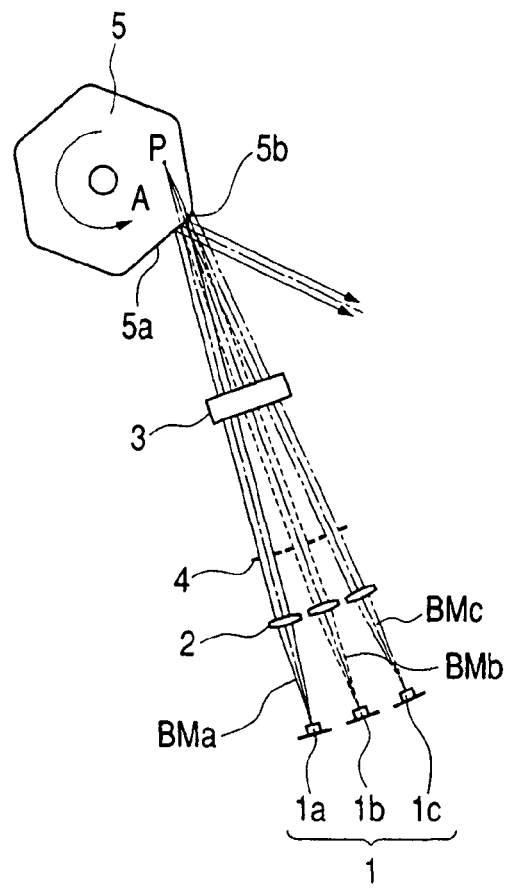
FIG. 17A is a view schematically illustrating a main portion of the multi-beam optical scanning apparatus of the sixth embodiment.
Figure 17B:
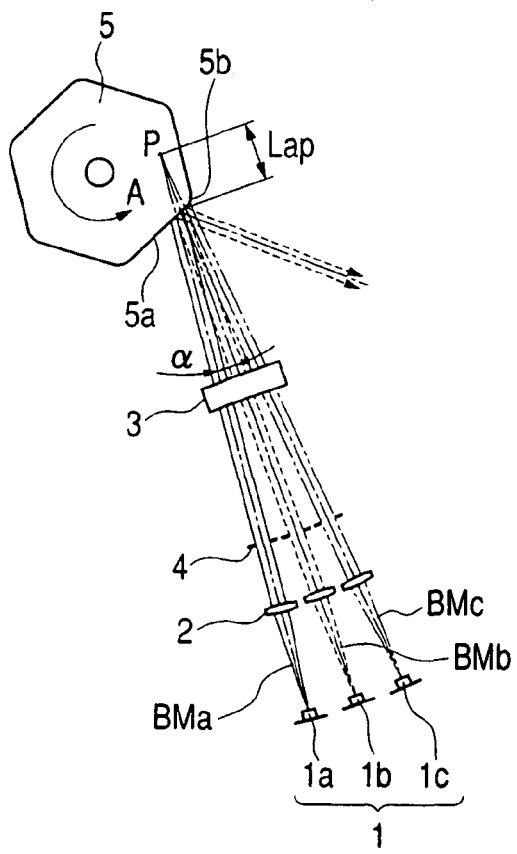
FIG. 17B is a view schematically illustrating a main portion of the multi-beam optical scanning apparatus of the sixth embodiment.
Figure 17C:
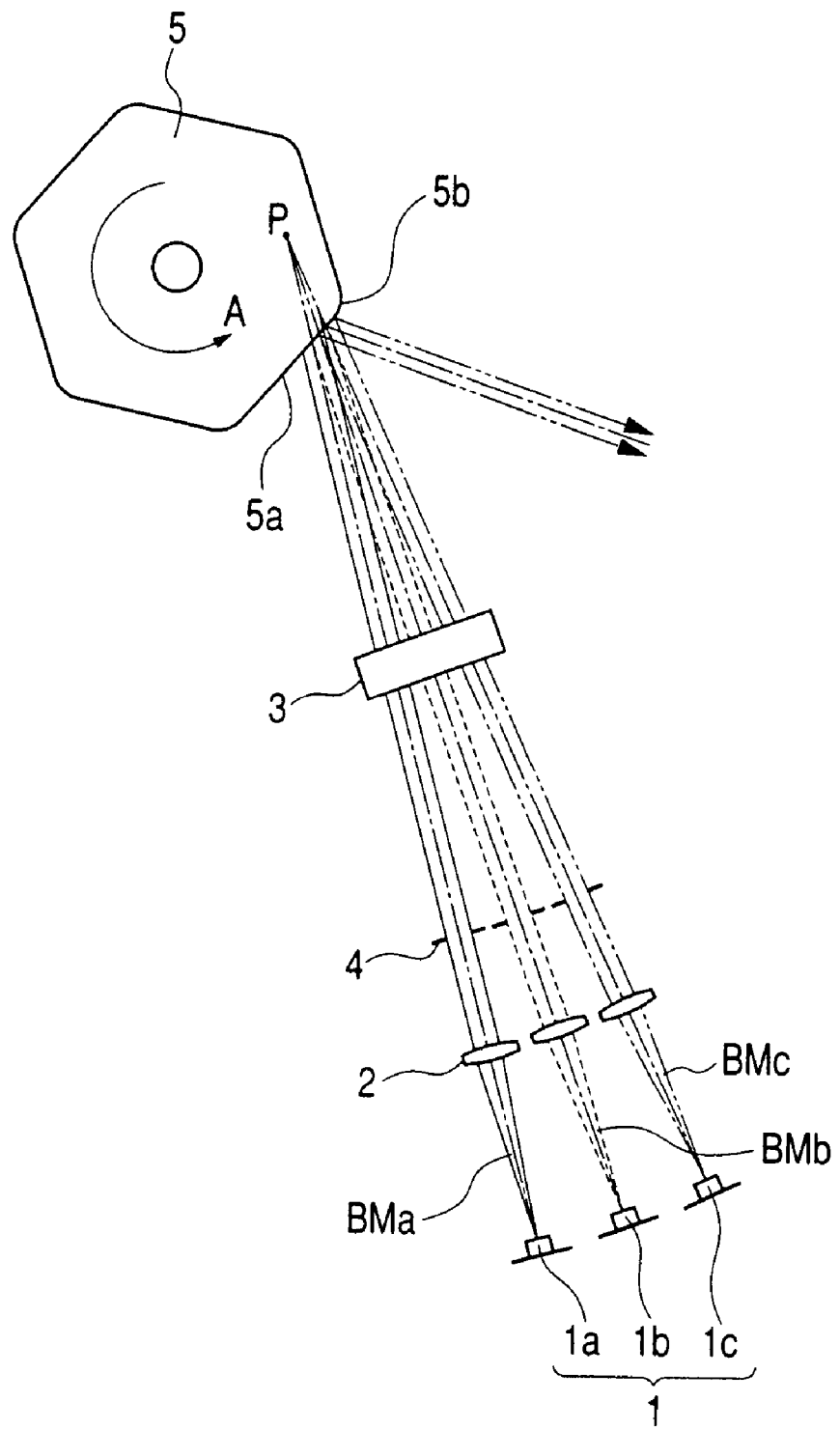
FIG. 17C is a view schematically illustrating a main portion of the multi-beam optical scanning apparatus of the sixth embodiment.

FIGS. 17A to 17C illustrate manners in which the three light beams BMa, BMb and BMc reach the deflecting facet 5*a*, respectively. In FIGS. 17A to 17C, like reference numerals designate the same elements as those illustrated in FIG. 16. In the sixth embodiment, the three light beams BMa, BMb and BMc emitted from the light source unit 1 are incident on the deflecting facet 5*a* in such a manner that these light beams intersect each other at a position of a point P. The three light beams reach different locations on the deflecting facet 5*a*.

FIG. 17A illustrates a manner in which the light beam BMa (indicated by a solid line) radiated for the purposes of APC of the radiation point (the third radiation point) 1*a* is reflectively deflected by the deflecting facet 5*a*. Here, the entire light beam BMa is reflectively deflected by the deflecting facet 5*a*, while portions of the other two light beams BMb and BMc stride over the chamfered portion 5b of the deflecting facet 5a.

FIG. 17B illustrates a manner in which the light beam BMb (indicated by a dashed line) radiated for the purposes of APC of the radiation point (the second radiation point) 1b is reflectively deflected by the deflecting facet 5a. Here, the entire light beams BMa and BMb are reflectively deflected by the deflecting facet 5a, while a portion of the light beam BMc strides over the chamfered portion 5b of the deflecting facet 5a.

FIG. 17C illustrates a manner in which the light beam BMc (indicated by an alternate long and two short dashes line) radiated for the purposes of APC of the radiation point (the first radiation point) 1c is reflectively deflected by the deflecting facet 5a. Here, all the three entire light beams BMa, BMb and BMc are reflectively deflected by the deflecting facet 5a.

In the sixth embodiment, the three light beams BMa, BMb and BMc are incident on the deflecting facet 5a without intersecting each other between the light source unit 1 and the deflecting facet 5a. Accordingly, the number M of light intersection is M=2×n=0 (n=0). The deflecting facet 5a can be effectively used in the event that the radiation points other than the radiation point (the first radiation point) 1c disposed on the most downstream side in the rotational direction A of the optical deflector 5 are excited in the first place. It is preferable to perform the light radiation in the order from the radiation point (the third radiation point) 1a disposed on the most upstream side in the rotational direction A of the optical deflector 5.

In the sixth embodiment, therefore, the radiation point (the third radiation point) 1a for radiating the light beam BMa disposed on the most upstream side in the rotational direction A of the optical deflector 5 is firstly excited to perform the APC, the radiation point (the second radiation point) 1b for radiating the light beam BMb is then excited to perform the APC, and the radiation point (the first radiation point) 1c for radiating the light beam BMc disposed on the most downstream side in the rotational direction A of the optical deflector 5 is last excited to perform the APC.

Further, also during the synchronous detection, the radiation point 1a for radiating the light beam BMa disposed on the most upstream side in the rotational direction A of the optical deflector 5 is firstly excited to perform the synchronous detection, the radiation point 1b for radiating the light beam BMb is then excited to perform the synchronous detection, and the radiation point 1c for radiating the light beam BMc disposed on the most downstream side in the rotational direction A of the optical deflector 5 is last excited to perform the synchronous detection.

The time sequence of the radiation order is as follows. The radiation point 1a for radiating the light beam BMa is firstly excited to perform the APC and then perform the synchronous detection, and is then turned off. Next, the radiation point 1b for radiating the light beam BMb is excited to perform the APC and then perform the synchronous detection, and is then turned off. Last, the radiation point 1c for radiating the light beam BMc is excited to perform the APC and then perform the synchronous detection, and is then turned off.

The deflecting facet 5a can be thus effectively used by appropriately setting the order of light radiation of the plural radiation points. In the sixth embodiment, therefore, even when a downsized optical deflector 5 is used, the APC can be performed without any influence of the ghost light beam, and the synchronous detection can be stably achieved using the same synchronous detecting unit. Therefore, the size of the multi-beam scanning apparatus can be decreased, and at the same time the cost can be reduced.

In the sixth embodiment, similar to the above-discussed third embodiment, the optical path directed to the scanning optical system 7 can be provided separately from the optical path directed to the synchronous detecting unit 10.

Seventh Embodiment

Figure 18:
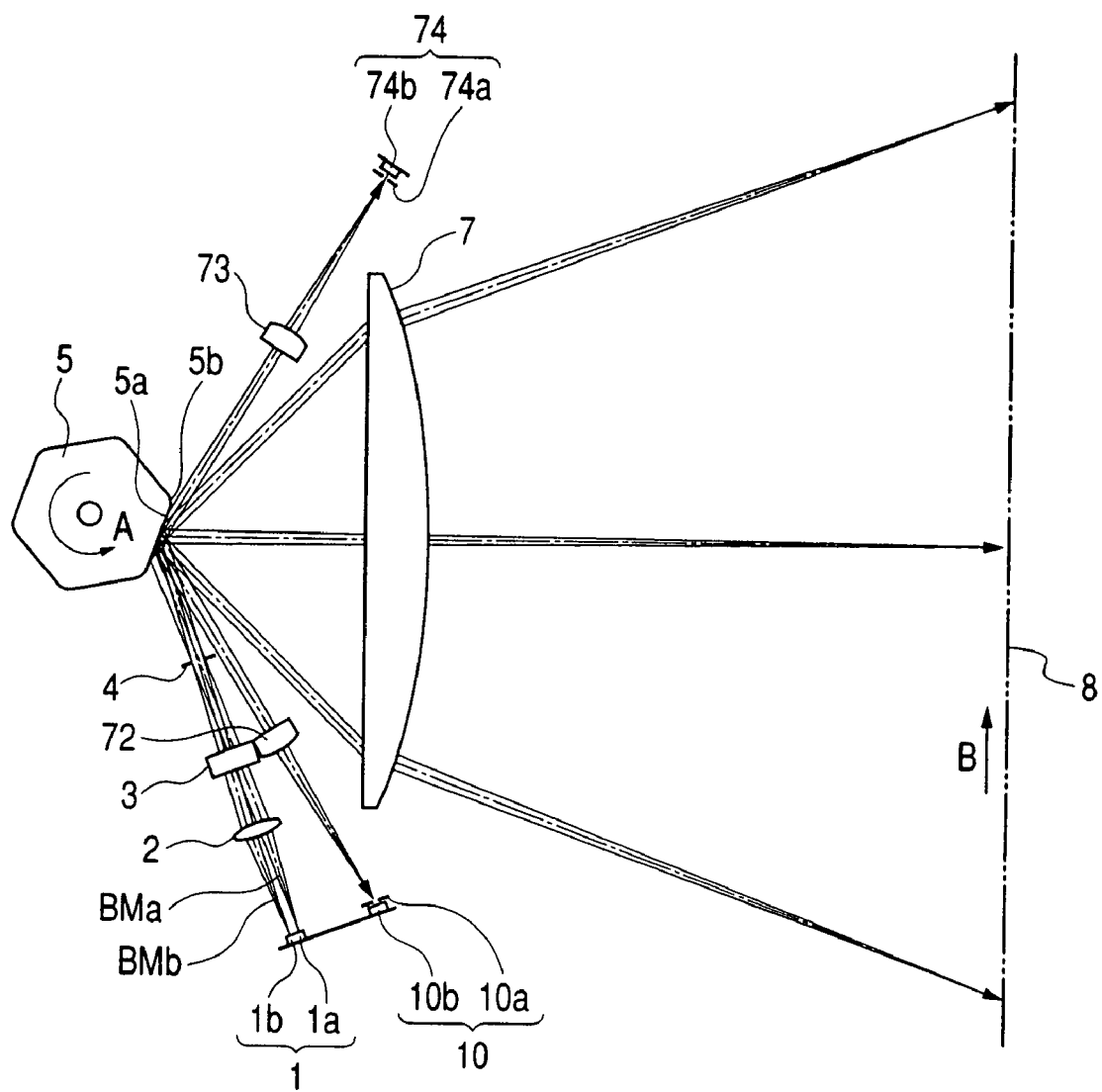
FIG. 18 is a cross-sectional view in a main scanning section illustrating a multi-beam optical scanning apparatus of a seventh embodiment according to the present invention.

FIG. 18 is a cross-sectional view in the main scanning direction illustrating a multi-beam scanning apparatus of a seventh embodiment according to the present invention. In FIG. 18, like reference numerals designate the same elements as those illustrated in FIG. 1.

The seventh embodiment is different from the above-discussed first embodiment in that a unit 74 for detecting the scanning position is provided outside the effective scanning range on the scanning finish side, an optical system (a BD lens) 73 for detecting the scanning position is provided between the optical deflector 5 serving as the rotational polygon mirror and the unit 74 for detecting the scanning position, and the chamfered portion 5b is formed at the end portion of the deflecting facet 5a of the optical deflector 5. Other construction and optical functions are approximately the same as those of the first embodiment, and similar technical advantages are achieved in the seventh embodiment.

In the seventh embodiment, the unit 74 for detecting the scanning position is comprised of a slit 74a and a sensor 74b such that a distance between two scanning lines can be detected using a signal from the sensor 74b. The optical system (an imaging lens) 73 for detecting the scanning position forms an image of a portion of the light beam reflectively deflected by the optical deflector 5 on the slit 74a.

The seventh embodiment is directed to a multi-beam scanning apparatus of a type of the number M=2×n+1 (n is an integer) of light intersection in which the light beams intersect each other only once between the light source unit 1 and the deflecting facet 5a.

Accordingly, prior to the scanning start, the radiation point (the second radiation point) 1a disposed on the most downstream side in the rotational direction A of the optical deflector 5 is excited in the first place, and the radiation point (the first radiation point) 1b disposed on the upstream side in the rotational direction A of the optical deflector 5 is then excited.

Specifically, the radiation point 1a for radiating the light beam BMa is excited to perform the APC, and is then turned off. Next, the radiation point 1b for radiating the light beam BMb disposed on the upstream side in the rotational direction A of the optical deflector 5 is excited to perform the APC and then perform the synchronous detection with its radiation being continued. Then, the radiation point 1a is re-excited to perform the synchronous detection.

Further, also after the scanning is finished, the radiation point (the third radiation point) 1a disposed on the downstream side in the rotational direction A of the optical deflector 5 is firstly excited, and the radiation point 1b (the first radiation point) disposed on the upstream side in the rotational direction A of the optical deflector 5 is then excited.

The deflecting can be thus effectively used by appropriately setting the light radiation order in the event that the plural light beams are radiated immediately prior to the start of scanning, or in the event that the plural light beams are radiated immediately subsequent to the finish of scanning. In the seventh embodiment, therefore, increase in the size of the optical deflector can be prevented.

Further, in the event that the plural light beams are radiated immediately before and after the effective scanning range on the scanned surface 8 as in the seventh embodiment, advantageous effects of the present invention can be more effectively obtained.

In the seventh embodiment, though description is made to the multi-beam scanning optical system of the type in which the light beams intersect each other once between the light source unit 1 and the deflecting facet 5a, and the light intersection number (M=2×n+1) is an odd number, the present invention can also be applied to a multi-beam scanning optical system of a type in which the light intersection number (M=2×n) is zero, or an even number. In this case, the light radiation order needs only to be reversed. In other words, in the event that the plural light beams are radiated immediately prior to the start of scanning, or in the event that the plural light beams are radiated immediately subsequent to the finish of scanning, it is preferable to firstly excite the radiation point disposed on the upstream side in the rotational direction A of the optical deflector 5. More preferably, the radiation point disposed on the upstream side in the rotational direction A of the optical deflector 5 is excited in the first place, and thereafter the radiation point disposed on the more downstream side is excited in the order.

In the first to seventh embodiments, description has been made to apparatuses in which the radiation points disposed with being spaced from each other in both the main scanning direction and the sub scanning direction are composed of two or more monolithic semiconductor lasers of edge emitting types, but the present invention can also be applied to an apparatus in which radiation points are comprised of three or more semiconductor lasers of surface emitting types. For example, the apparatus can use a surface emitting semiconductor laser in which four or more radiation points are arranged in a two-dimensional array.

Further, since the present invention aims at solving the problem that is likely to occur in apparatuses in which two or more light beams are incident on the deflecting facet of a deflecting unit (for example, a rotational polygon mirror) at different incident angles, the present invention can also be applied to apparatuses in which two or more monolithic semiconductor lasers each including at least one radiation point is used, composition of the two or more light beams is executed by a beam composite system (a polarization beam splitter, or the like), and the two or more light beams are incident on the deflecting facet of a deflecting unit (for example, a rotational polygon mirror) at different incident angles.

(Image Forming Apparatus)

Figure 19:
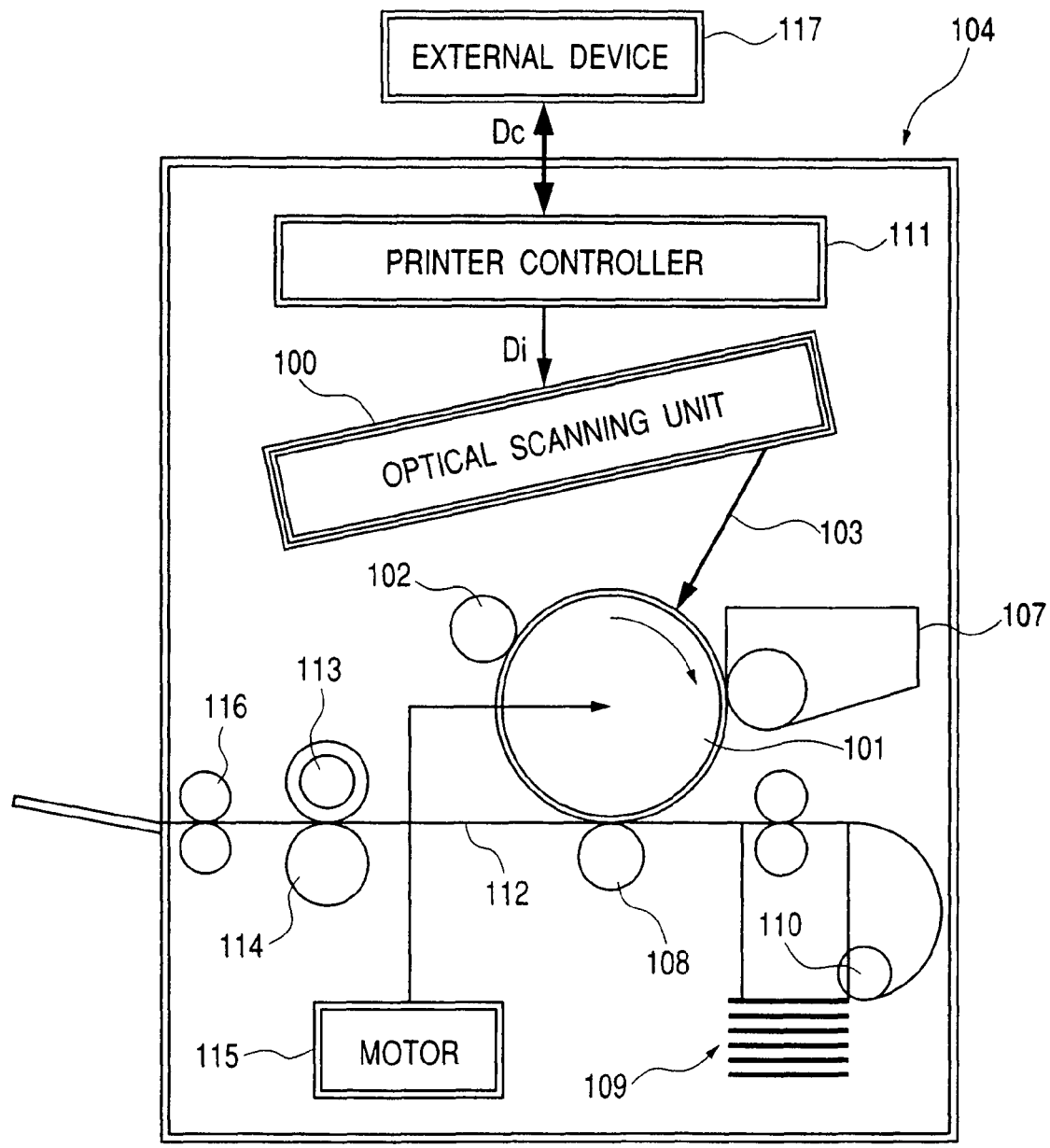
FIG. 19 is a cross-sectional view in a sub scanning section illustrating an embodiment of an image forming apparatus according to the present invention.

FIG. 19 is a cross-sectional view of a main portion along the sub scanning direction illustrating an embodiment of an image forming apparatus according to the present invention. In FIG. 19, reference numeral 104 designates an image forming apparatus. This image forming apparatus 104 accepts input of code data Dc from an external device 117, such as a personal computer or the like. This code data Dc is converted into image data (dot data) Di by a printer controller 111 in the apparatus 104. This image data Di is supplied to A multi-beam optical scanning apparatus 100 having the structure as described in either of the above embodiments. This optical scanning apparatus 100 outputs two or more light beams 103 modulated according to the image data Di, and these light beams 103 scan a photosensitive surface of a photosensitive drum 101 in the main scanning direction.

The photosensitive drum 101 serving as an electrostatic latent image carrier (a photosensitive body) is rotated in a clockwise direction by a motor 115. With the rotation thereof, the photosensitive surface of the photosensitive drum 101 moves in the sub scanning direction perpendicular to the main scanning direction, relative to the two or more light beams 103. Above the photosensitive drum 101, a charging roller 102 for uniformly charging the surface of the photosensitive drum 101 is disposed so as to contact the surface. And, the surface of the photosensitive drum 101 charged by the charging roller 102 is exposed to the light beams 103 scanned by the optical scanning apparatus 100.

As described previously, the light beams 103 are modulated based on the image data Di, and electrostatic latent images are formed on the surface of the photosensitive drum 101 under irradiation with the light beams 103. These electrostatic latent images are developed into toner images by a developing unit 107 disposed so as to contact the photosensitive drum 101 downstream in the rotating direction of the photosensitive drum 101 from the irradiation position of the light beams 103.

The toner image developed by the developing unit 107 is transferred onto a sheet 112 which is a transfer material, by a transfer roller 108 disposed opposed to the photosensitive drum 101 below the photosensitive drum 101. Sheets 112 are stored in a sheet cassette 109 in front of the photosensitive drum 101 (on a right side of FIG. 19), but sheet feed can also be performed by hand feeding. A sheet feed roller 110 is disposed at an end of the sheet cassette 109, and feeds each sheet 112 in the sheet cassette 109 into the conveyance path.

The sheet 112, onto which the unfixed toner image is transferred as described above, is further transferred to a fixing unit located behind the photosensitive drum 101 (i.e., on a left side of FIG. 19). The fixing unit is composed of a fixing roller 113 having a fixing heater (not illustrated) inside and a pressing roller 114 disposed in pressure contact with the fixing roller 113, and heats the sheet 112 while pressing the sheet 112 thus conveyed from the transfer part, in a nip portion between the fixing roller 113 and the pressing roller 114, to fix the unfixed toner image on the sheet 112. Sheet discharge rollers 116 are further disposed behind the fixing roller 113 to discharge the fixed sheet 112 to the outside of the image forming apparatus 104.

Although not illustrated in FIG. 19, the print controller 111 also performs control of each section in the image forming apparatus, including the motor 115, and control of a polygon motor, etc., in A multi-beam optical scanning apparatus 104 described above, in addition to the conversion of data described above.

(Color Image Forming Apparatus)

Figure 20:
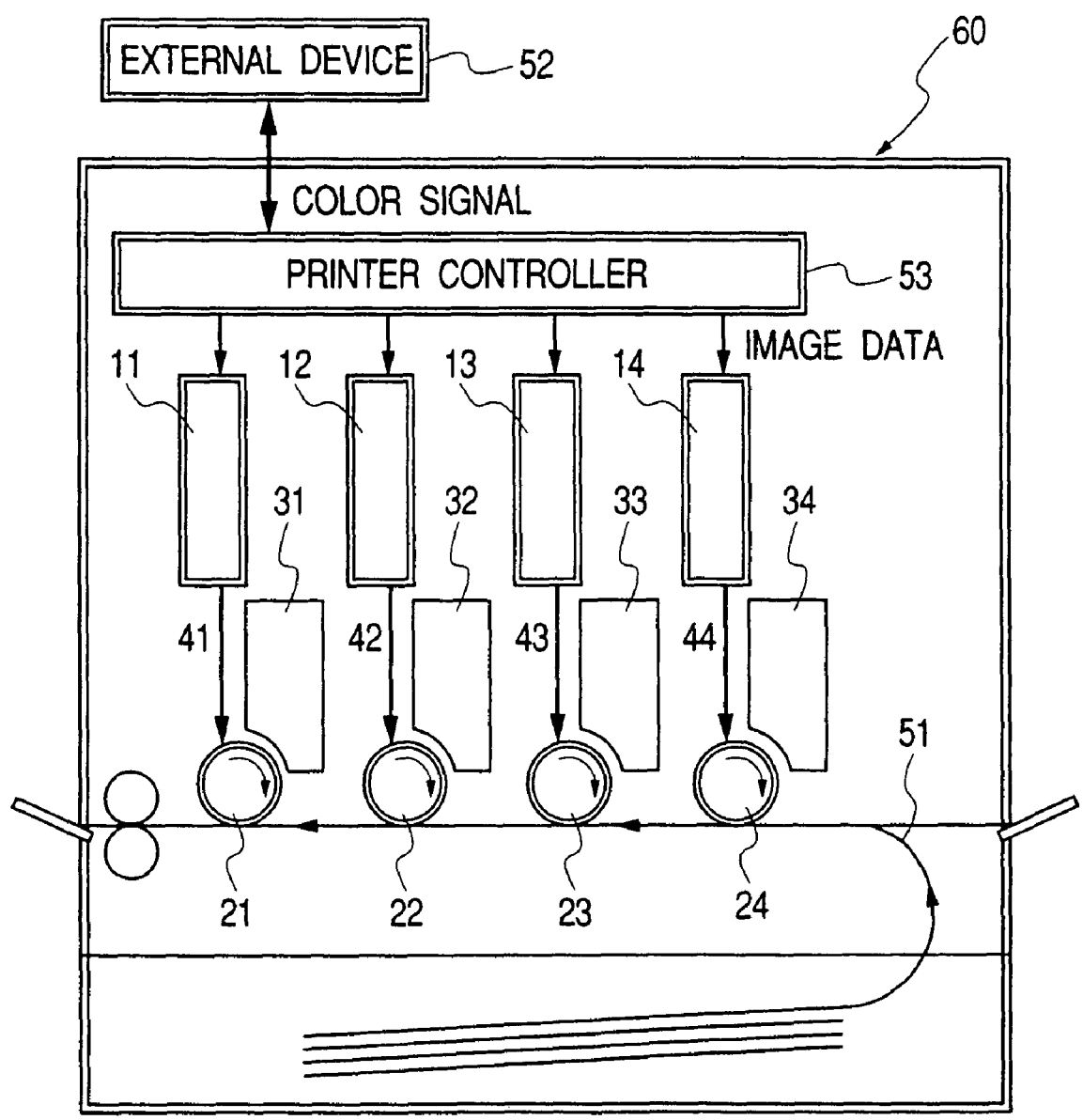
FIG. 20 is a schematic view illustrating a main portion of an embodiment of a color image forming apparatus according to the present invention.
Figure 21:
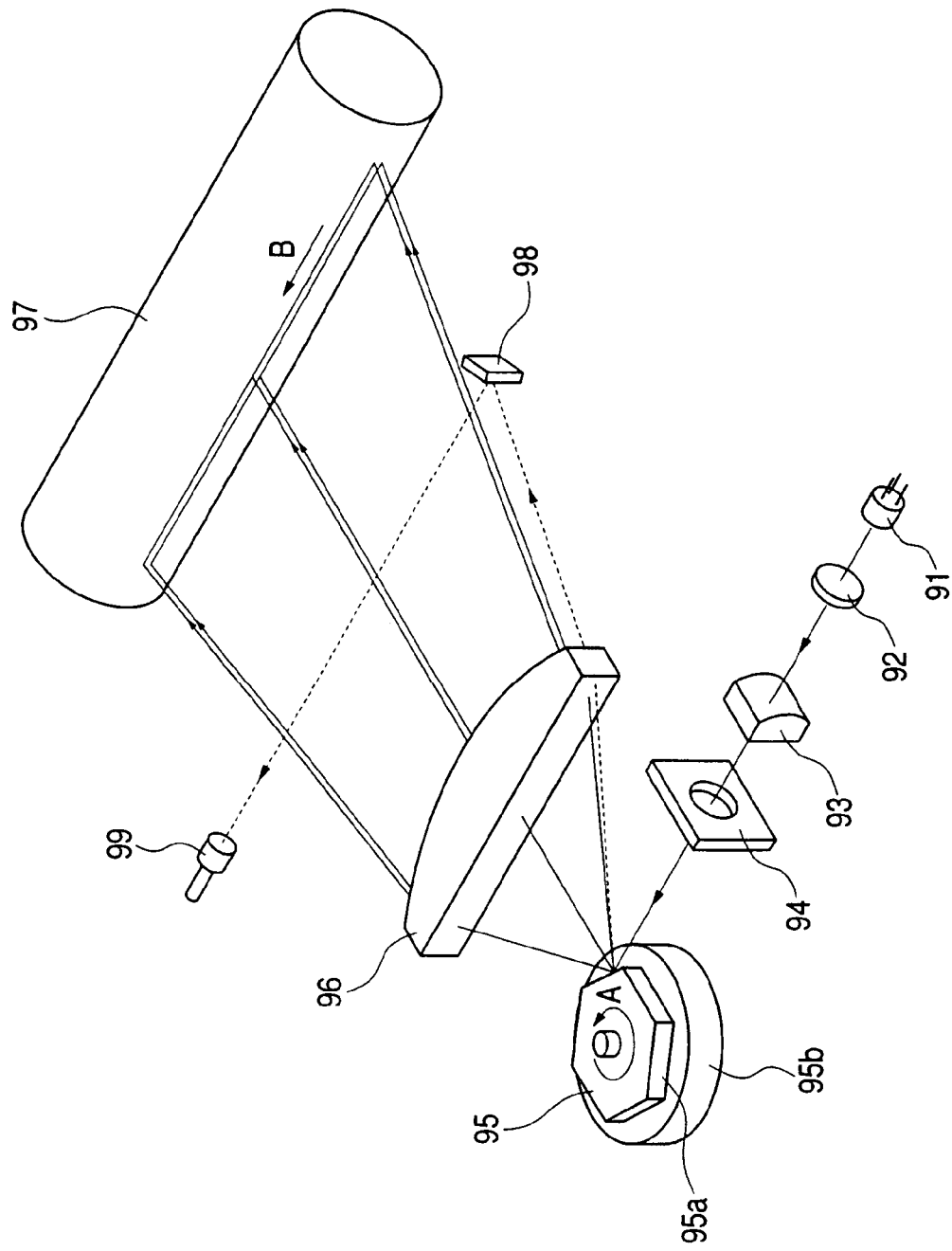
FIG. 21 is a perspective view illustrating a conventional multi-beam optical scanning apparatus.

FIG. 20 is a schematic view illustrating a main portion of a color image forming apparatus of the present invention. This embodiment is directed to a color image forming apparatus of a tandem type in which four scanning apparatuses using plural light beams are arranged in a parallel manner, and image information is recorded on each photosensitive drum serving as an image carrier. In FIG. 20, reference numeral 60 represents a color image forming apparatus. Reference numerals 11, 12, 13 and 14 represent optical scanning apparatuses as described in the above embodiments of the scanning apparatuses, respectively. Reference numerals 21, 22, 23 and 24 represent photosensitive drums serving as image carrier, respectively. Reference numerals 31, 32, 33 and 34 represent developing units, respectively. Reference numeral 51 represents a conveyance belt.

In FIG. 20, the color image forming apparatus 60 accepts input of color signals of R (red), G (green) and B (blue) from an external device 52 such as a personal computer. Those color signals are converted into image data (dot data) of C (cyan), M (magenta), Y (yellow), and Bk (black) by a printer controller 53 in the apparatus. The image data is supplied to the optical scanning apparatuses 11, 12, 13 and 14. Each of those optical scanning apparatuses 11, 12, 13 and 14 outputs a light beam 41, 42, 43 or 44 modulated according to each image data, and these light beams scan photosensitive surfaces of photosensitive drums 21, 22, 23 and 24 in the main scanning direction, respectively.

In the color image forming apparatus of this embodiment, there are provided four light scanning apparatuses 11, 12, 13 and 14 corresponding to colors of C (cyan), M (magenta), Y (yellow), and Bk (black), respectively, and these scanning apparatuses record image signals (image data) on the photosensitive drums 21, 22, 23 and 24 in a parallel manner, respectively, to speedily print a color image.

In the color image forming apparatus of this embodiment, latent images of colors are formed on corresponding photosensitive drums 21, 22, 23 and 24 by the four optical scanning apparatuses 11, 12, 13 and 14 using two or more light beams based on the image data, respectively. After that, the latent images are multi-transferred onto a recording material, and a full-color picture is thus formed.

As the external device 52, a color image reading apparatus provided with a CCD sensor can be used, for example. In this case, this color image reading apparatus and the color image forming apparatus 60 constitute a color digital copying apparatus.

The present invention can provide more preeminent technical advantages in the tandem-type color image forming apparatus of FIG. 20. The reason therefor is as follows. In the tandem-type color image forming apparatus, plural (two or more) light beams are incident on different photosensitive drums 21, 22, 23 and 24, respectively, images are formed on different scanned surfaces for respective colors, and thereafter the respective color images are superimposed on a sheet, so that color shift (registration shift) due to the shift in scanning start positions of plural light beams incident on the same scanned surface is a serious problem.

According to the present invention, as described in the foregoing, the radiation point for radiating the light beam reaching the place nearest the center of the deflecting facet of the deflecting unit is excited in the first place. Accordingly, the deflecting facet can be effectively used, and the optical deflecting unit can be downsized. Subsequently, the entire apparatus can be downsized, and a multi-beam scanning apparatus capable of readily constructing structures of the deflecting unit, the motor, and the like can be provided.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A multi-beam optical scanning apparatus comprising:
light source means including a plurality of radiation points disposed spaced from each other in a main scanning direction and in a sub-scanning direction;
a rotational polygon minor for deflecting a plurality of light beams radiated from the plurality of radiation points toward a surface to be scanned, which is scanned with the plurality of light beams; and
an imaging optical system for imaging the plurality of light beams deflected for scanning by a deflecting facet of the rotational polygon minor on the surface to be scanned,
wherein the respective light emission amounts of the plurality of light beams emitted from the plurality of radiation points of the light source means are controlled by auto-power-control; and
wherein letting a first radiation point be a radiation point for radiating the light beam which reaches a farthest location from a center of the deflecting facet of the rotational polygon mirror in a main scanning section among the plurality of light beams emitted from the plurality of radiation points and letting a second radiation point be a radiation point for radiating another light beam when controlled by the auto-power-control, the deflecting facet of the rotational polygon minor has a width in the main scanning section in which a light beam reaching the farthest location from a center of the deflecting facet is eclipsed by an edge portion of the deflecting facet if a light beam from the first radiation point which radiates a light beam reaching the farthest location from the center of the deflecting facet is emitted prior to a light beam from the second radiation point when controlled by the auto-power-control, and further control is performed such that the light beam from the second radiation point is radiated prior to the light beam from the first radiation point when controlled by the auto-power-control.

2. A multi-beam optical scanning apparatus according to claim 1, further comprising synchronous detecting means for detecting the plurality of light beams deflected for scanning by the deflecting facet of the rotational polygon minor so as to output a synchronous signal to determine a scanning start position of the plurality of light beams within an effective scanning range on the surface to be scanned in the main scanning direction,
wherein synchronous detection in which the synchronous detecting means detects the plurality of light beams is performed prior to recording an image on the surface to be scanned within the effective scanning range by the plurality of light beams, and
wherein the auto-power-control is performed prior to the synchronous detection and control is performed such that the light beam from the second radiation point is radiated prior to the light beam from the first radiation point when controlled by the auto-power-control.

3. An image forming apparatus comprising:
a multi-beam optical scanning apparatus according to claim 1;
an image bearing member placed at the surface to be scanned;
developing means for developing an electrostatic latent image formed on the image bearing member by the light beam with which the multi-beam optical scanning apparatus scans, as a toner image;
transferring means for transferring a developed toner image onto a transferring material; and
fixing means for fixing the transferred toner image on the transferring material.

4. A multi-beam optical scanning apparatus comprising:
light source means including a plurality of radiation points disposed spaced from each other in a main scanning direction and in a sub-scanning direction;
a rotational polygon minor for deflecting a plurality of light beams radiated from the plurality of radiation points toward a surface to be scanned, which is scanned with the plurality of light beams; and
an imaging optical system for imaging the plurality of light beams deflected for scanning by a deflecting facet of the rotational polygon minor on the surface to be scanned, wherein the respective light emission amounts of the plurality of light beams emitted from the plurality of radiation points of the light source means are controlled by auto-power-control; and wherein the deflecting facet of the rotational polygon minor has a width in a main scanning section in which a light beam last incident is eclipsed by an edge portion of the deflecting facet if a light beam from a radiation point which is to radiate a light beam last incident on the deflecting facet of the rotational polygon minor is emitted prior to light beams from the other radiation points when controlled by the auto-power-control, and further a light beam from a radiation point which radiates a light beam first incident on the deflecting facet of the rotational polygon mirror is emitted prior to light beams from the other radiation points out of the plurality of light beams emitted from the plurality of radiation points when controlled by the auto-power-control.

5. A multi-beam optical scanning apparatus according to claim 4, further comprising synchronous detecting means for detecting the plurality of light beams deflected for scanning by the deflecting facet of the rotational polygon minor so as to output a synchronous signal to determine a scanning start position of the plurality of light beams within an effective scanning range on the surface to be scanned in the main scanning direction, wherein synchronous detection in which the synchronous detecting means detects the plurality of light beams is performed prior to recording an image on the surface to be scanned within the effective scanning range by the plurality of light beams, and wherein the auto-power-control is performed prior to the synchronous detection and a light beam from a radiation point which radiates a light beam first incident on the deflecting facet of the rotational polygon minor is emitted prior to light beams from the other radiation points among the plurality of light beams emitted from the plurality of radiation points when controlled by the auto-power-control.

6. An image forming apparatus comprising:
a multi-beam optical scanning apparatus according to claim 4;
an image bearing member placed at the surface to be scanned;
developing means for developing an electrostatic latent image formed on the image bearing member by the light beam with which the multi-beam optical scanning apparatus scans, as a toner image;
transferring means for transferring a developed toner image onto a transferring material; and
fixing means for fixing the transferred toner image on the transferring material.

* * * * *